US012296578B2

(12) United States Patent
Kanazawa et al.

(10) Patent No.: US 12,296,578 B2
(45) Date of Patent: May 13, 2025

(54) IMAGE FORMING APPARATUS AND METHOD TO ADJUST AMOUNT OF SHEET MEDIUM BETWEEN UPSTREAM ROLLER AND DOWNSTREAM ROLLER IN CONVEYANCE DIRECTION

(71) Applicant: BROTHER KOGYO KABUSHIKI KAISHA, Nagoya (JP)

(72) Inventors: Gakuro Kanazawa, Toyokawa (JP); Taisei Okuzono, Nagoya (JP); Yushi Deura, Nagoya (JP); Yasuhiro Nakano, Nagoya (JP); Haruka Azechi, Nagoya (JP); Yuki Tsujimura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 134 days.

(21) Appl. No.: 18/145,285

(22) Filed: Dec. 22, 2022

(65) Prior Publication Data

US 2023/0202208 A1 Jun. 29, 2023

(30) Foreign Application Priority Data

Dec. 24, 2021 (JP) ................................ 2021-211430
Dec. 19, 2022 (JP) ................................ 2022-202540

(51) Int. Cl.
*B41J 11/00* (2006.01)
*B41J 2/21* (2006.01)
(Continued)

(52) U.S. Cl.
CPC ........... *B41J 11/007* (2013.01); *B41J 2/2132* (2013.01); *B41J 11/0055* (2013.01); *B41J 29/393* (2013.01); *B41J 11/663* (2013.01)

(58) Field of Classification Search
CPC .... B41J 11/007; B41J 11/0055; B41J 29/393; B41J 11/663; B41J 11/0095; B41J 15/005;
(Continued)

(56) References Cited

U.S. PATENT DOCUMENTS

2021/0178786 A1* 6/2021 Izoe ...................... B65H 23/14

FOREIGN PATENT DOCUMENTS

| | | |
|---|---|---|
| JP | H01-97336 U | 6/1989 |
| JP | H05-50318 U | 7/1993 |
| JP | 2015-168492 A | 9/2015 |

* cited by examiner

*Primary Examiner* — Jannelle M Lebron
(74) *Attorney, Agent, or Firm* — Scully, Scott, Murphy & Presser, PC

(57) ABSTRACT

An image forming apparatus includes a controller that performs one or more times a first image forming process including performing image formation on a sheet medium, and conveying the sheet medium in a conveyance direction by rotating a first roller by a first number of rotations and rotating a second roller disposed downstream of the first roller in the conveyance direction by a second number of rotations smaller than the first number of rotations. When a count of times the first image forming process has been performed becomes a particular number of times, the controller performs a second image forming process including performing image formation on the sheet medium, and conveying the sheet medium by rotating the first roller by a third number of rotations smaller than the first number of rotations and rotating the second roller by the second number of rotations.

9 Claims, 10 Drawing Sheets

(51) Int. Cl.
*B41J 11/66* (2006.01)
*B41J 29/393* (2006.01)

(58) Field of Classification Search
CPC .. B41J 11/706; B41J 13/0018; B41J 11/0045; B41J 13/02; B41J 11/70; B65H 20/00; B65H 20/02; B65H 26/00; B65H 26/06; B65H 26/02; B65H 26/08; G03G 15/6529
See application file for complete search history.

IMAGE FORMING APPARATUS AND METHOD TO ADJUST AMOUNT OF SHEET MEDIUM BETWEEN UPSTREAM ROLLER AND DOWNSTREAM ROLLER IN CONVEYANCE DIRECTION

REFERENCE TO RELATED APPLICATIONS

This application claims priority from Japanese Patent Applications No. 2021-211430 filed on Dec. 24, 2021 and No. 2022-202540 filed on Dec. 19, 2022. The entire contents of the priority applications are incorporated herein by reference.

BACKGROUND ART

A technology has been known in which in an image forming apparatus having a plurality of roller pairs to convey a sheet medium, the rotational speeds of the rollers included in one roller pair, of the plurality of roller pairs, are made higher than the rotational speeds of the rollers included in the other roller pairs.

DESCRIPTION

In the known technology, for instance, when an upstream roller pair and a downstream roller pair arranged along a conveyance path in a conveyance direction are driven simultaneously to feed the sheet medium, if the number of rotations of the rollers of the upstream roller pair are larger than those of the downstream roller pair, a feed amount of the sheet medium fed by the upstream roller pair becomes larger than that by the downstream roller pair. Thus, due to a larger feed amount by which the sheet medium is fed by the upstream roller pair than by the downstream roller pair, an excess portion of the sheet medium is generated between the two roller pairs. Therefore, if the roller pairs repeatedly perform such sheet feeding operations, an amount of the excess portion of the sheet medium between the roller pairs will increase cumulatively. Thereby, if the excess portion of the sheet medium between the roller pairs is generated too much, the sheet medium may stick to an inner surface of a path between the roller pairs and/or be bent strongly in the path.

Aspects of the present disclosure are advantageous to provide one or more improved techniques that enable an image forming apparatus to adjust an amount of a sheet medium between an upstream roller and a downstream roller in a conveyance direction to fall within an appropriate range.

According to aspects of the present disclosure, an image forming apparatus is provided, which includes a sheet medium storage, a first roller, a second roller, a print engine, and a controller. The sheet medium storage is configured to accommodate a sheet medium. The first roller is configured to feed, from the sheet medium storage, the sheet medium in a conveyance direction along a conveyance path. The second roller is disposed downstream of the first roller in the conveyance direction. The second roller is configured to convey the sheet medium fed by the first roller in the conveyance direction along the conveyance path. The print engine is disposed downstream of the second roller in the conveyance direction. The print engine is configured to form an image on the sheet medium conveyed by the second roller. The controller is configured to perform a first image forming process one or more times. The first image forming process includes causing the print engine to perform image formation on the sheet medium. The first image forming process further includes conveying the sheet medium in the conveyance direction by rotating the first roller by a first number of rotations and rotating the second roller by a second number of rotations that is smaller than the first number of rotations. The controller is further configured to, when a count of times the first image forming process has been performed becomes a particular number of times, perform a second image forming process. The second image forming process includes causing the print engine to perform image formation on the sheet medium. The second image forming process further includes conveying the sheet medium in the conveyance direction by rotating the first roller by a third number of rotations smaller than the first number of rotations and rotating the second roller by the second number of rotations.

According to aspects of the present disclosure, further provided is an image forming apparatus that includes a sheet medium storage, a first roller, a second roller, a print engine, and a controller. The sheet medium storage is configured to accommodate a sheet medium. The first roller is configured to feed, from the sheet medium storage, the sheet medium in a conveyance direction along a conveyance path. The second roller is disposed downstream of the first roller in the conveyance direction. The second roller is configured to convey the sheet medium fed by the first roller in the conveyance direction along the conveyance path. The print engine is disposed downstream of the second roller in the conveyance direction. The print engine is configured to form an image on the sheet medium conveyed by the second roller. The controller is configured to perform a first image forming process. The first image forming process includes causing the print engine to perform image formation on the sheet medium. The first image forming process further includes conveying the sheet medium in the conveyance direction by causing the first roller to feed the sheet medium at a feeding rate of a first feed amount per particular period of time and causing the second roller to feed the sheet medium at a feeding rate of a second feed amount per particular period of time. The second feed amount is different from the first feed amount. The controller is further configured to, when the second roller conveys the sheet medium by a particular conveyance amount in the first image forming process, perform a second image forming process. The second image forming process includes causing the print engine to perform image formation on the sheet medium. The second image forming process further includes conveying the sheet medium in the conveyance direction by causing the first roller to feed the sheet medium at a feeding rate of a third feed amount per particular period of time and causing the second roller to feed the sheet medium at the feeding rate of the second feed amount per particular period of time. The third feed amount is different from the first feed amount and the second feed amount.

According to aspects of the present disclosure, further provided is a method implementable on a controller of an image forming apparatus. The method includes performing a first image forming process one or more times. The first image forming process includes causing a print engine to perform image formation on a sheet medium. The first image forming process further includes conveying the sheet medium in a conveyance direction by rotating a first roller by a first number of rotations and rotating a second roller by a second number of rotations that is smaller than the first number of rotations. The second roller is disposed downstream of the first roller in the conveyance direction. The method further includes performing a second image forming process when a count of times the first image forming process has been performed becomes a particular number of times. The second image forming process includes causing the print engine to perform image formation on the sheet medium. The second image forming process further includes conveying the sheet medium in the conveyance direction by rotating the first roller by a third number of rotations smaller than the first number of rotations and rotating the second roller by the second number of rotations. The image forming apparatus includes a sheet medium storage, the first roller, the second roller, the print engine, and the controller. The sheet medium storage is configured to accommodate the sheet medium. The first roller is configured to feed, from the sheet medium storage, the sheet medium in the conveyance direction along a conveyance path. The second roller is configured to convey the sheet medium fed by the first roller in the conveyance direction along the conveyance path. The print engine is disposed downstream of the second roller in the conveyance direction.

According to aspects of the present disclosure, further provided is a method implementable on a controller of an image forming apparatus. The method includes performing a first image forming process. The first image forming process includes causing a print engine to perform image formation on a sheet medium. The first image forming process further includes conveying the sheet medium in a conveyance direction by causing a first roller to feed the sheet medium at a feeding rate of a first feed amount per particular period of time and causing a second roller to feed the sheet medium at a feeding rate of a second feed amount per particular period of time. The second roller is disposed downstream of the first roller in the conveyance direction. The second feed amount is different from the first feed amount. The method further includes performing a second image forming process when the second roller conveys the sheet medium by a particular conveyance amount in the first image forming process. The second image forming process includes causing the print engine to perform image formation on the sheet medium. The second image forming process further includes conveying the sheet medium in the conveyance direction by causing the first roller to feed the sheet medium at a feeding rate of a third feed amount per particular period of time and causing the second roller to feed the sheet medium at the feeding rate of the second feed amount per particular period of time. The third feed amount is different from the first feed amount and the second feed amount. The image forming apparatus includes a sheet medium storage, the first roller, the second roller, the print engine, and the controller. The sheet medium storage is configured to accommodate the sheet medium. The first roller is configured to feed, from the sheet medium storage, the sheet medium in the conveyance direction along a conveyance path. The second roller is configured to convey the sheet medium fed by the first roller in the conveyance direction along the conveyance path. The print engine is disposed downstream of the second roller in the conveyance direction.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Hereinafter, a printer 100 of a first illustrative embodiment according to aspects of the present disclosure will be described with reference to the accompanying drawings. In the following description, a vertical direction, a front-to-rear direction, and a left-to-right direction shown in FIG. 1 will be defined as a front-to-rear direction, and a left-to-right direction of the printer 100, respectively. It is noted that hereinafter, each of the above directions may represent two mutually-opposite directions along each individual direction. Specifically, for instance, the vertical direction may represent both the upward direction and the downward direction that are along the vertical direction. Further, the front-to-rear direction may represent both the frontward direction and the rearward direction that are along the front-to-rear direction. Moreover, the left-to-right direction may represent both the leftward direction and the rightward direction that are along the left-to-right direction.

Figure 1:
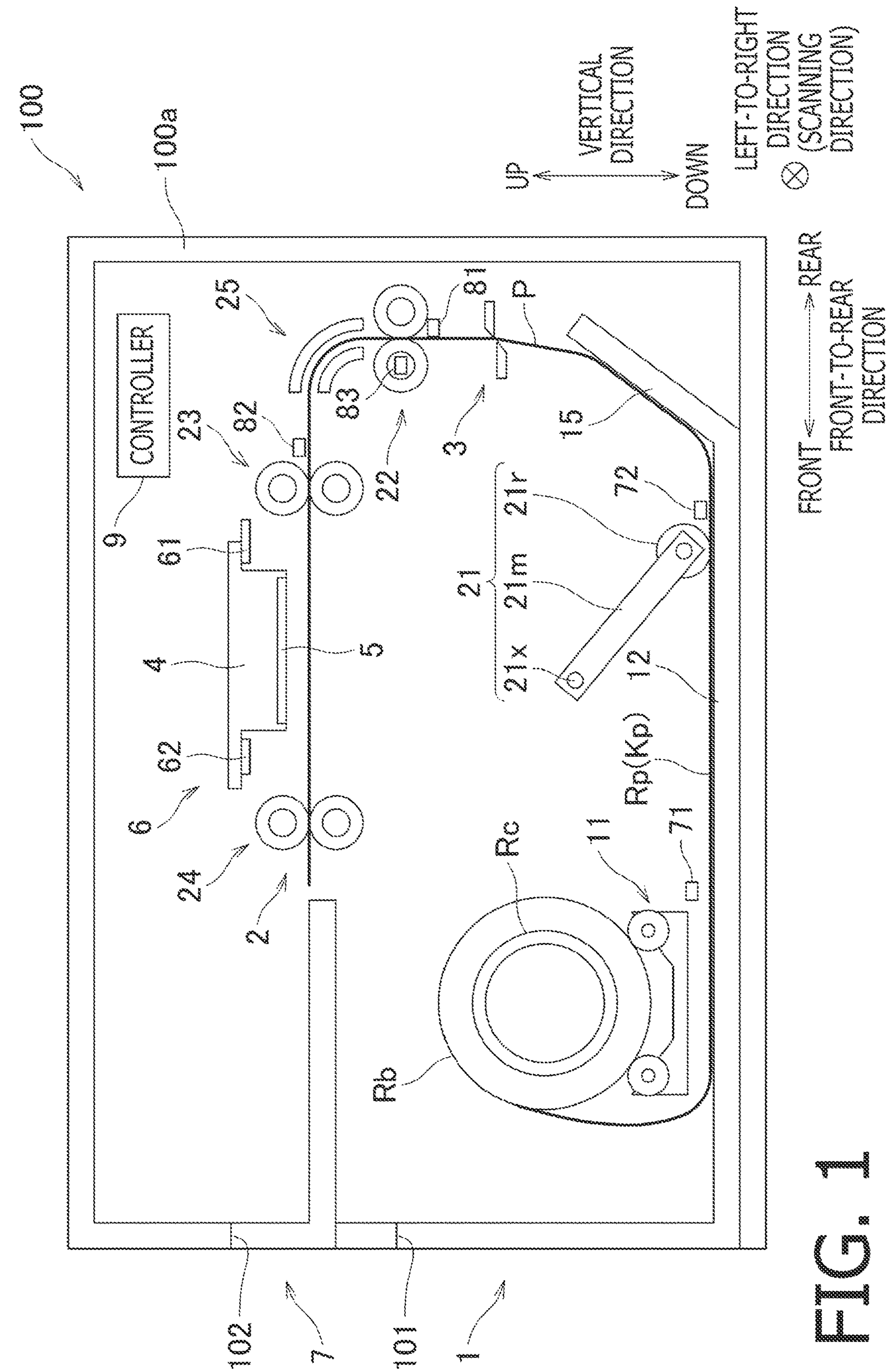
FIG. 1 is a cross-sectional side view schematically showing a configuration of a printer.
Figure 2:
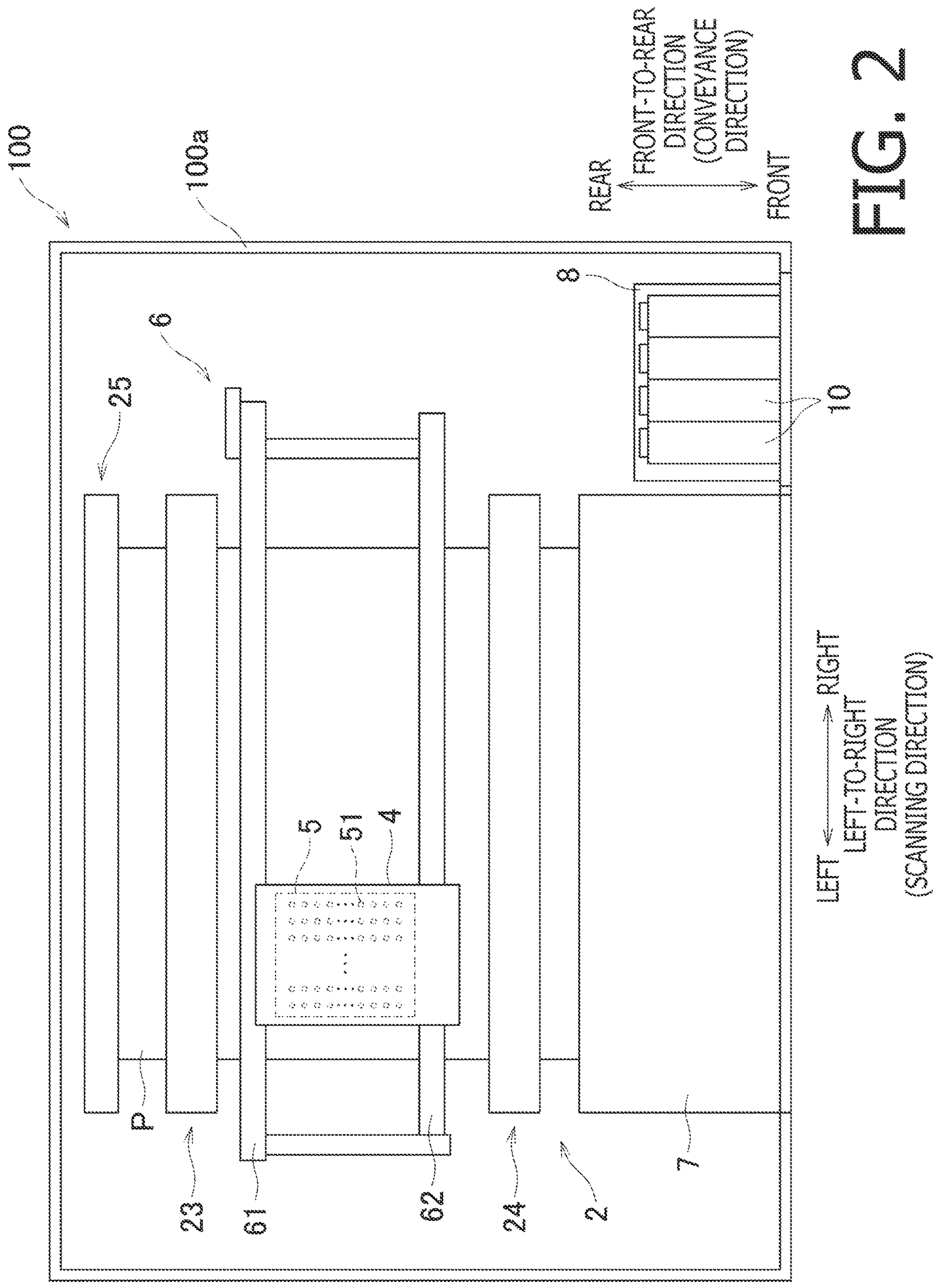
FIG. 2 is a plan view schematically showing the configuration of the printer.

As shown in FIGS. 1 and 2, the printer 100 includes a housing 100*a*, a feed tray 1, a conveyor 2, a cutter 3, a carriage 4, a head 5, a moving mechanism 6, a discharge tray 7, a cartridge holder 8, and a controller 9.

The feed tray 1 is disposed below the head 5 in the housing 100*a*. The feed tray 1 is configured to be inserted into and removed from the housing 100*a* along the front-to-rear direction through an opening 101 formed in a front wall of the housing 100*a*.

The feed tray 1 accommodates a roll body Rb and cut paper Kp. The feed tray 1 may be configured to accommodate both the roll body Rb and the cut paper Kp at the same time, or to selectively accommodate one of the roll body Rb and the cut paper Kp. The feed tray 1 has a roll body supporter 11 and a placement surface 12. The roll body supporter 11 is configured to support the roll body Rb. The placement surface 12 is configured to support the cut paper Kp placed thereon.

The roll body Rb is a long sheet of roll paper Rp wound in a roll shape around an outer circumference of a cylindrical core member Rc. The cut paper Kp is shorter than the long sheet of paper that forms the roll body Rb. Examples of the cut paper Kp may include, but are not limited to, A4 size paper and B5 size paper. In the first illustrative embodiment, a largest one of usable sizes of the cut paper Kp for the printer 100 is A4 size paper.

A roll body sensor 71 is disposed slightly rearward of the roll body supporter 11. The roll body sensor 71 is enabled to detect whether the roll body Rb is supported by the roll body supporter 11 of the feed tray 1. More specifically, the roll body sensor 71 is configured to detect the roll paper Rp unwound from the roll body Rb, thereby detecting that the roll body Rb is supported by the roll body supporter 11 of the feed tray 1. A result of the detection by the roll body sensor 71 is output to the controller 9.

The conveyor 2 includes a pick-up roller unit 21, two intermediate rollers 22, two conveyance rollers 23, two discharge rollers 24, and a guide 25.

The pick-up roller unit 21 includes a feed motor 21*a* (see FIG. 4), a pick-up roller 21*r*, and an arm 21*m*. The pick-up roller 21*r* is configured to feed, from the feed tray 1, the roll paper Rp unwound from the roll body Rb supported by the roll body supporter 11, or the cut paper Kp placed on the placement surface 12. In the following description, the roll paper Rp and the cut paper Kp may be collectively referred to as the "sheet P" without distinguishing them from each other. The pick-up roller 21*r* is disposed above a bottom wall of the feed tray 1. The pick-up roller 21*r* is rotatably supported by a distal end of the arm 21*m*. The pick-up roller 21*r* is driven to rotate by the feed motor 21*a*. The arm 21*m* is rotatably supported by a shaft 21*x*. The shaft 21*x* is supported by the housing 1*a*. The arm 21*m* is in contact with an elastic member (not shown) such as a plate spring or a coil spring. This elastic member is configured to apply to the arm 21*m* a force to urge the arm 21*m* toward the bottom wall of the feed tray 1. The force becomes greater as the arm 21*m* moves further counterclockwise in FIG. 1. The pick-up roller 21*r* is pressed against the sheet P by the action of the elastic member. The higher the pick-up roller 21*r* is positioned depending on a situation of the pick-up roller 21*r*, the greater a force to press the pick-up roller 21*a* against the sheet P is.

When the pick-up roller 21*r* is driven to rotate by the feed motor 21*a*, a feeding force directed rearward from the front is applied to the sheet P that is in contact with the pick-up roller 21*r*. Thereby, the sheet P is fed from the feed tray 1. A rear wall 15 provided at a rear end of the feed tray 1 is inclined in such a manner that an upper end of the rear wall 15 is positioned rearward of a lower end of the rear wall 15. Therefore, the sheet P is fed obliquely upward from the feed tray 1.

A feed position sensor 72 is disposed slightly rearward of the pick-up roller unit 21. The feed position sensor 72 is configured to detect whether the sheet P is placed in a feed position where the sheet P is feedable by the pick-up roller unit 21. A result of the detection by the feed position sensor 72 is output to the controller 9.

Figure 3:
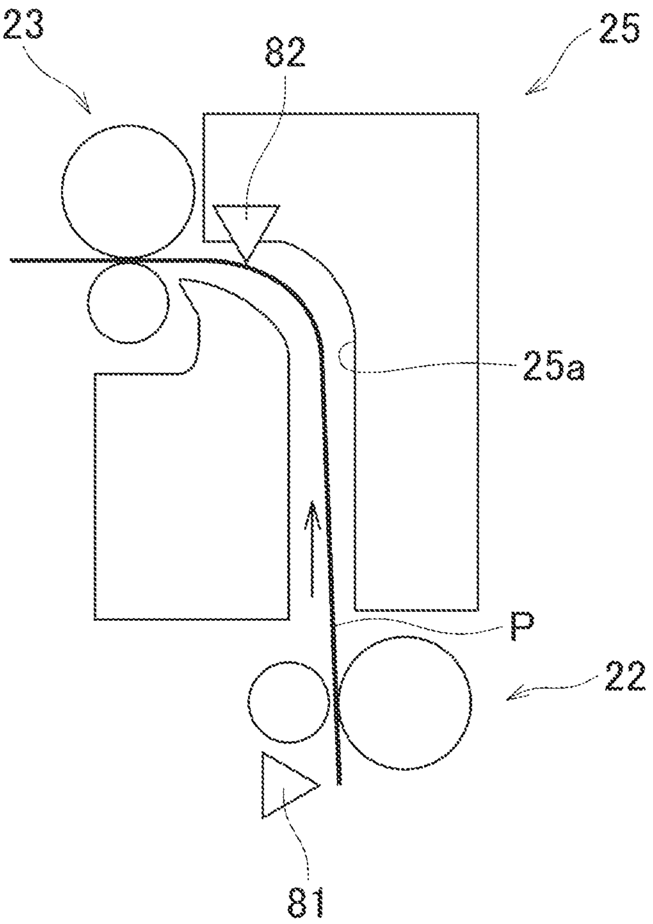
FIG. 3 is an enlarged view showing a configuration around a guide of the printer shown in FIG. 1.

The intermediate rollers 22 include a driving roller and a driven roller. The driving roller is driven to rotate by an intermediate motor 22*a* (see FIG. 4). The driven roller is configured to rotate according to the rotation of the driving roller. When the intermediate motor 22*a* is driven by the controller 9, the intermediate rollers 22 rotate while pinching the sheet P, thereby conveying the sheet P. The intermediate rollers 22 are disposed above the rear end of the feed tray 1. The intermediate rollers 22 are configured to convey the sheet P upward while pinching the sheet P fed obliquely upward from the feed tray 1 by the pick-up roller unit 21. The guide 25 is disposed above the intermediate rollers 22. The guide 25 forms a path 25*a* that is a portion between the intermediate rollers 22 and the conveyance rollers 23, of the conveyance path along which the sheet P is conveyed. As shown in FIG. 3, the path 25*a* extends upward from the intermediate rollers 22 and then curves forward toward the conveyance rollers 23. The sheet P is conveyed upward by the intermediate rollers 22 and then passes through the path 25*a*. Thus, the sheet P is conveyed forward to the conveyance rollers 23 while guided along the path 25*a*.

A leading end position sensor 81 is disposed slightly below the intermediate rollers 22. The leading end position sensor 81 is configured to detect a leading end of the sheet P and output a detection result to the controller 9. A timing at which the leading end position sensor 81 detects the leading end of the sheet P is adjusted to be substantially coincident (i.e., coincident or nearly coincident) with a timing at which the leading end of the sheet P reaches the intermediate rollers 22.

The conveyance rollers 23 include a driving roller and a driven roller. The driving roller is driven to rotate by a conveyance motor 23*a* (see FIG. 4). The driven roller is configured to rotate according to the rotation of the driving roller. A rotary encoder 83 is provided to the driven roller of the conveyance rollers 23. The rotary encoder 83 is configured to detect a rotational quantity of the driven roller, thereby detecting a rotational quantity of the conveyance rollers 23. The rotary encoder 83 is further configured to output to the controller 9 a signal indicating the rotational quantity of the conveyance rollers 23. The discharge rollers 24 include a driving roller and a driven roller. The driving roller is driven to rotate by a discharge motor 24*a* (see FIG. 4). The driven roller is configured to rotate according to the rotation of the driving roller.

A leading end position sensor 82 is disposed slightly rearward of the conveyance rollers 23. The leading end position sensor 82 is configured to detect the leading end of the sheet P and output a detection result to the controller 9. A timing at which the leading end position sensor 82 detects the leading end of the sheet P is adjusted to be substantially coincident (i.e., coincident or nearly coincident) with a timing at which the leading end of the sheet P reaches the conveyance rollers 23.

When the conveyance motor 23*a* and the discharge motor 24*a* are driven by the controller 9, the conveyance rollers 23 and the discharge rollers 24 rotate while pinching the sheet P, thereby conveying the sheet P forward, i.e., in a conveyance direction. The conveyance rollers 23 are disposed rearward of the head 5 (i.e., upstream of the head 5 in the conveyance direction). The discharge rollers 24 are disposed in front of the head 5 (i.e., downstream of the head 5 in the conveyance direction). The conveyance rollers 23 are configured to feed the sheet P guided forward along the guide 25, further forward to the discharge rollers 24. The discharge rollers 24 are configured to feed the sheet P fed forward by the conveyance rollers 23, further forward while pinching the sheet P, thereby discharging the sheet P onto the discharge tray 7.

As described above, the conveyance mechanism 2 is configured to convey the sheet P along the conveyance path extending from the feed tray 1 to the discharge tray 7 through the pick-up roller unit 21, the intermediate rollers 22, the guide 25, the conveyance rollers 23, and the discharge rollers 24 in this order.

The cutter 3 is disposed between the rear end of the feed tray 1 and the intermediate rollers 22. For instance, the cutter 3 includes a disk-shaped rotary blade and a driven blade. In the cutter 3, the rotary blade is driven to rotate by a cutting motor 3*a* (see FIG. 4), and reciprocates along the left-to-right direction. The roll paper Rp, unwound from the roll body Rb and conveyed, is cut along a width direction of the roll paper Rp by the cutter 3 in response to the cutting motor 3*a* being driven by the controller 9. Thus, a single sheet cut from the roll paper Rp, with a trailing end thereof formed, is discharged onto the discharge tray 7.

Figure 4:
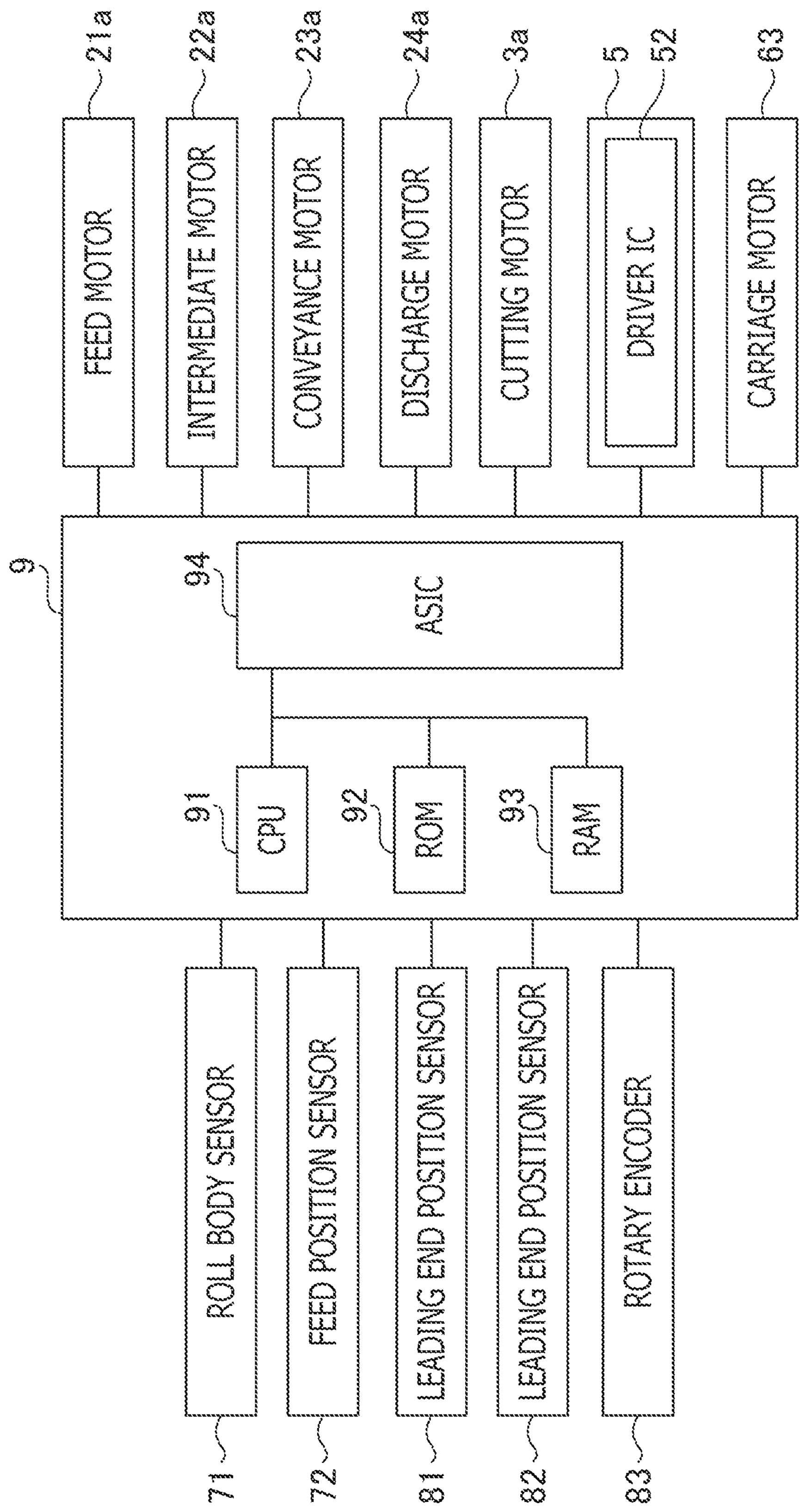
FIG. 4 is a block diagram showing an electrical configuration of the printer.

The head 5 includes a plurality of nozzles 51 (see FIG. 2) formed on a lower surface of the head 5, and a driver IC 52 (see FIG. 4). The head 5 is configured to, when the driver IC 52 is driven by the controller 9, eject ink from the nozzles 51. Each of ink droplets ejected from the head 5 reaches and lands in a corresponding area on the sheet P that is in an image forming position opposed to the lower surface of the head 5. Thereby, an image is formed on the sheet P. The head 5 is mounted on the carriage 4.

The moving mechanism 6 includes two guide rails 61 and 62, and a carriage motor 63 (see FIG. 4). The two guide rails 61 and 62 are spaced apart from each other in the front-to-rear direction. Each of the guide rails 61 and 62 extends along the left-to-right direction. The carriage 4 is disposed to straddle the two guide rails 61 and 62. The carriage 4 is connected with the carriage motor 63, for instance, via a belt (not shown). The carriage 4 is configured to, when the carriage motor 63 is driven by the controller 9, move along the left-to-right direction (i.e., a scanning direction) along the guide rails 61 and 62.

The discharge tray 7 is disposed in front of the head 5 and above the feed tray 1 in the housing 100*a*. The discharge tray 7 is configured to be inserted into and removed from the housing 100*a* along the front-to-rear direction via an opening 102 formed in the front wall of the housing 100*a*. The discharge tray 7 is further configured to receive the sheet P on which the image has been formed by the head 5.

As shown in FIG. 2, the cartridge holder 8 is disposed rightward of the discharge tray 7 and in front of the moving mechanism 6. The cartridge holder 8 is configured to hold four ink cartridges 10 removably attached thereto. The four ink cartridges 10 are configured to store black ink, yellow ink, cyan ink, and magenta ink, respectively. The ink of the corresponding color is supplied from each ink cartridge 10 attached to the cartridge holder 8 to the head 5, for instance, via a tube (not shown).

The controller 9 is configured to take overall control of the printer 100. As shown in FIG. 4, the controller 9 is electrically connected with the feed motor 21*a*, the intermediate motor 22*a*, the conveyance motor 23*a*, the discharge motor 24*a*, the cutting motor 3*a*, the driver IC 52, the carriage motor 63, the roll body sensor 71, the feed position sensor 72, the leading end position sensors 81 and 82, and the rotary encoder 83.

As shown in FIG. 4, the controller 9 includes a CPU ("CPU" is an abbreviation for "Central Processing Unit") 91, a ROM ("ROM" is an abbreviation for "Read Only Memory") 92, a RAM ("RAM" is an abbreviation for "Random Access Memory") 93, and an ASIC ("ASIC" is an abbreviation for "Application Specific Integrated Circuit") 94. The ROM 92 stores programs executable by the CPU 91 and the ASIC 94, and various types of fixed data. The RAM 93 is configured to temporarily store data (e.g., image data, after-mentioned $X_{MID}$, and buffer values) necessary for execution of the programs.

The various types of fixed data stored in the ROM 92 include data indicating the number of rotations $X_{PF}$ of the conveyance rollers 23, and data indicating various setting values for calculating the number of rotations of the intermediate rollers 22. The various setting values include after-mentioned $L_{Set}$, $X_{BF}$, $T_{BF}$, and $B_{TGT}$. Further, the various types of fixed data include data indicating a conversion relationship (hereinafter referred to as "conversion data") between the number of rotations of the intermediate rollers 22 and a feed amount of the sheet P. As will be described below, based on the conversion data, a feed amount of the sheet P fed by the intermediate rollers 22 is calculated when the intermediate rollers 22 have made a certain number of rotations (i.e., when the intermediate rollers 22 have rotated a certain number of times). The conversion relationship indicated by the conversion data is based on an assumption that the intermediate rollers 22 do not slip over the sheet P. Further, the various types of fixed data include an initial setting value for an after-mentioned buffer value. It is noted that hereinafter, the "number of rotations" may be referred to as the "rotation number."

Figure 6:
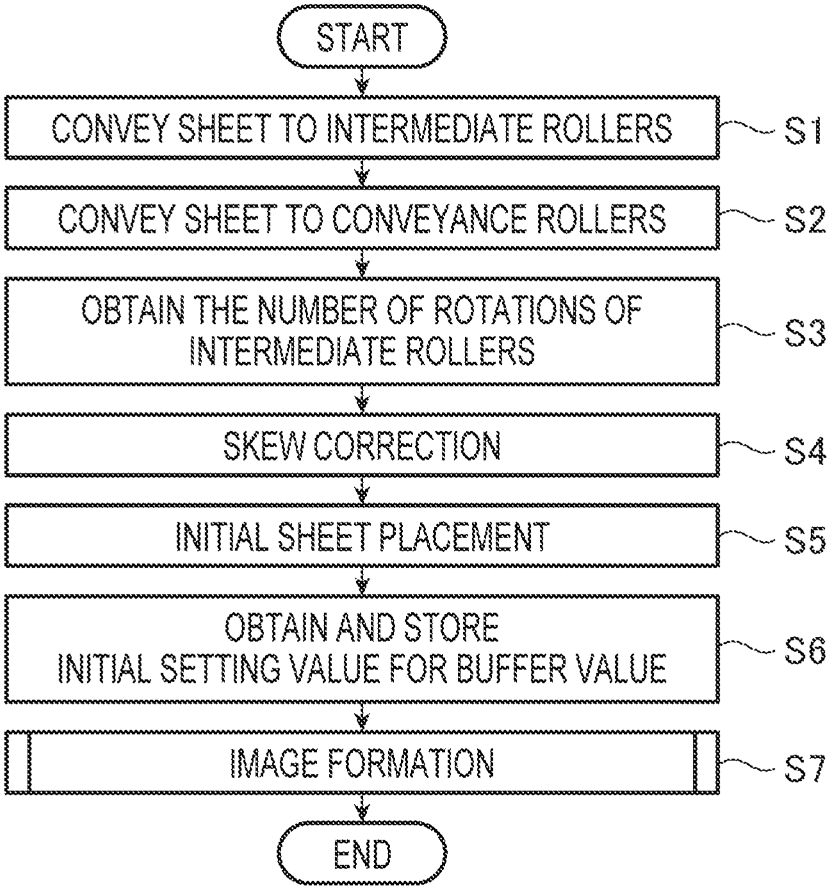
FIG. 6 is a flowchart showing a procedure of a process to be performed by a controller of the printer.
Figure 7:
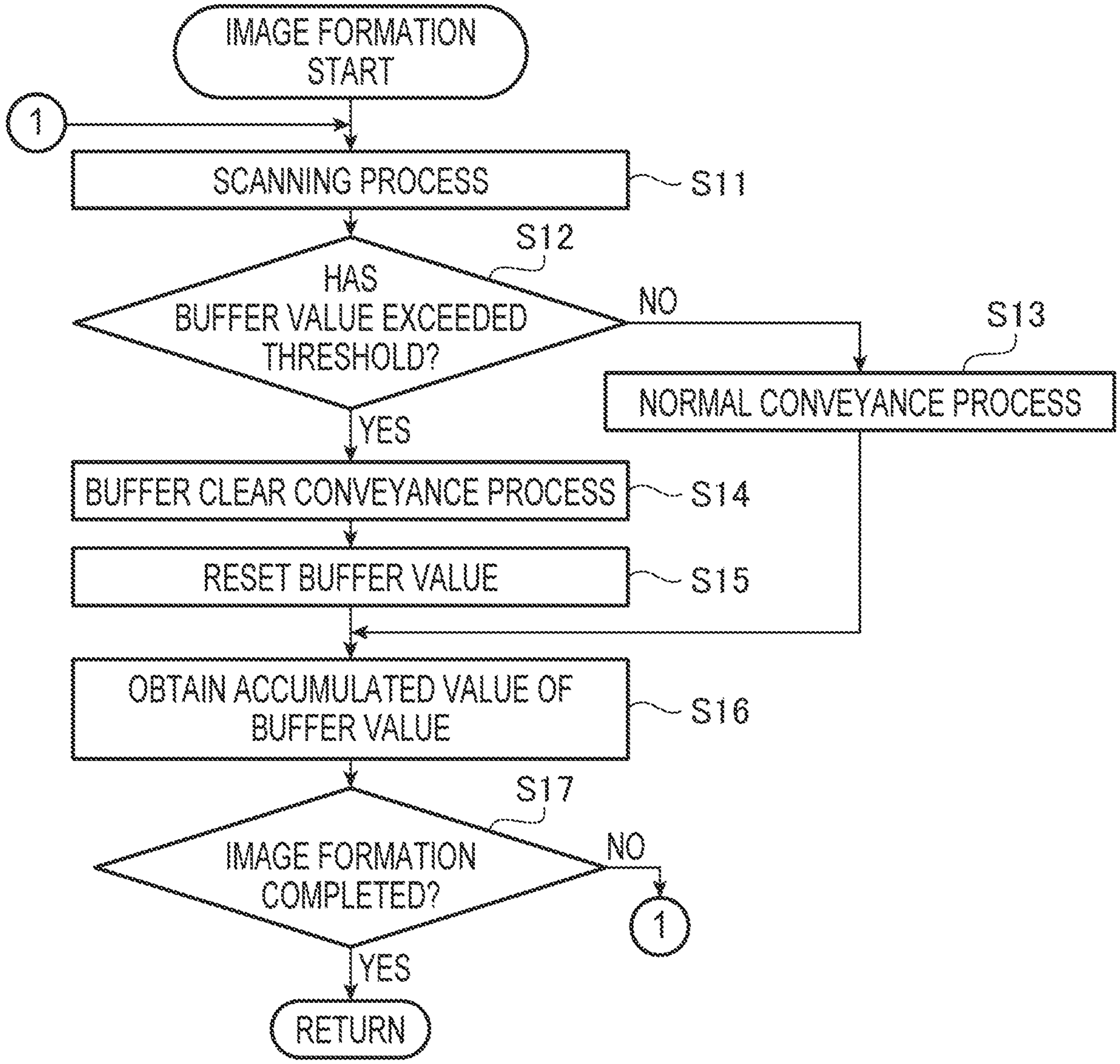
FIG. 7 is a flowchart showing a procedure of image formation.

The controller 9 may be configured to perform various processes only by the CPU 91, or only by the ASIC 94, or by the CPU 91 and the ASIC 94 collaborating with each other. Further, the controller 9 may include a single CPU 91 configured to perform processing solely, or may include a plurality of CPUs 91 configured to share the processing with each other. Moreover, the controller 9 may include a single ASIC 94 configured to perform processing solely, or may include a plurality of ASICs 91 configured to share the processing with each other. Furthermore, the controller 9 may be configured to perform various processes (including processes as shown in FIGS. 6 and 7) by one or more CPUs 91 executing programs stored in a non-transitory computer-readable storage medium such as the ROM 92. The following provides an explanation of various processes performed by the controller 9.

The controller 9 determines whether the sheet P fed from the feed tray 1 by the pick-up roller unit 21 is the roll paper Rp or the cut paper Kp as a sheet type determination process. This determination is made based on the results of the detection by the roll body sensor 71 and the feed position sensor 72. Specifically, when the roll body sensor 71 detects that roll paper Rp is supported by the roll body supporter 11, and the feed position sensor 72 detects that the sheet P is positioned in the feed position, the controller 9 determines that the sheet P fed by the pick-up roller unit 21 is the roll paper Rp. Meanwhile, when the roll body sensor 71 detects that roll paper Rp is not supported by the roll body supporter 11, and the feed position sensor 72 detects that the sheet P is positioned in the feed position, the controller 9 determines that the sheet P fed by the pick-up roller unit 21 is the cut paper Kp.

The controller 9 performs image formation on the sheet P based on an image forming instruction transmitted from an external device (e.g., a PC or a smartphone) by a user. Specifically, the image formation is performed by alternately and repeatedly executing a conveyance process and a scanning process. The conveyance process is a process of causing the conveyance mechanism 2 to convey the sheet P over a particular distance in the conveyance direction along the conveyance path. The scanning process is a process of causing the head 5 to eject ink from the plurality of nozzles 51 onto the sheet P while causing the moving mechanism 6 to move the carriage 4 in the scanning direction. When the sheet P is the roll paper Rp, the roll paper Rp receives the ink ejected from the head 5 while being conveyed by the conveyance mechanism 2. Then, the roll paper Rp is cut by the cutter 3 to a desired length (e.g., a length indicated by the above image forming instruction). Thus, a single sheet of the desired length on which an image has been formed is cut from the roll paper Rp by the cutter 3 and then discharged onto the discharge tray 7. Meanwhile, when the sheet P is the cut paper Kp, the cut paper Kp receives the ink ejected from the head 5 while being conveyed by the conveyance mechanism 2. Thus, the cut paper Kp on which an image has been formed is discharged onto the discharge tray 7.

Figure 8A:
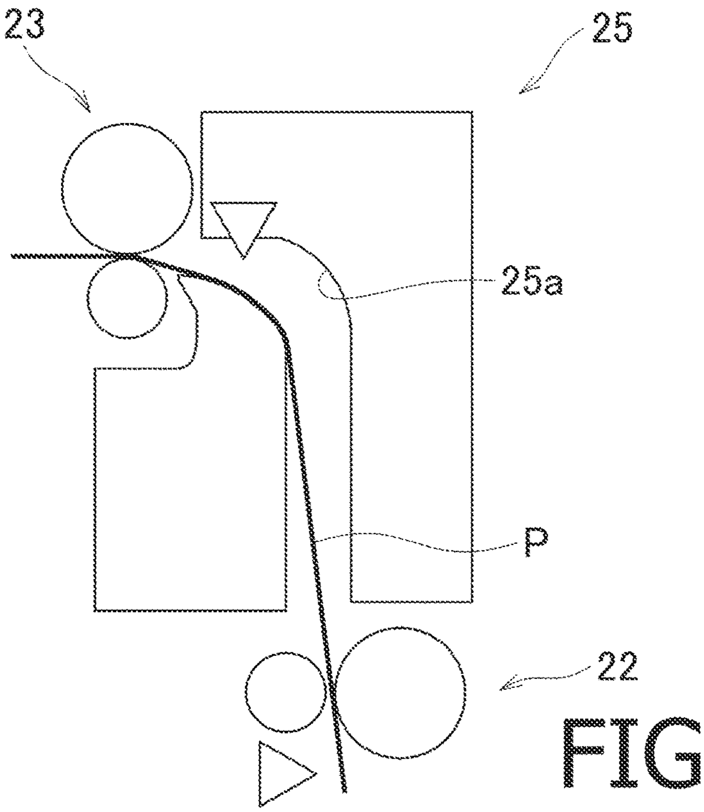
FIG. 8A is a cross-sectional side view schematically showing a state where the sheet is into contact with the guide and taut.

The controller 9 adjusts a rotational speed of each roller of the conveyance mechanism 2 as appropriate in such a manner that the image formation on the sheet P is properly performed in the above conveyance process. In particular, if the rotational speed of the intermediate rollers 22 is lower than the rotational speed of the conveyance rollers 23, the feed amount of the sheet P fed by the intermediate rollers 22 will be smaller than the feed amount of the sheet P fed by the conveyance rollers 23. This may cause the sheet P to come into contact with the guide 25 and become taut, as shown in FIG. 8A. When the sheet P is in such a state, the conveyance rollers 23 try to feed the sheet P over a larger amount than the intermediate rollers 22, and a friction is generated between the sheet P and the guide 25. Therefore, in this case, the sheet P is pulled to the upstream side of the conveyance path. As a result, the conveyance rollers 23 may slip over the sheet P, and the quality of image formation by the head 5 may deteriorate. To suppress the occurrence of such a situation, it is necessary to adjust the rotational speed of the intermediate rollers 22 appropriately.

Figure 5:
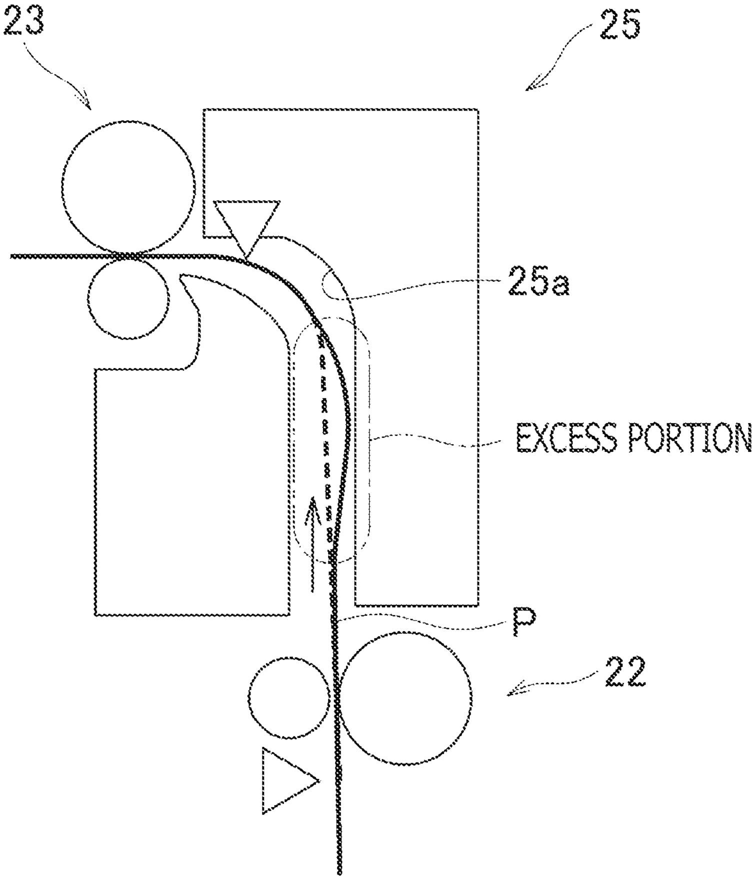
FIG. 5 is a cross-sectional side view schematically showing a state where an excess portion is generated of a sheet being conveyed along a path defined by the guide shown in FIG. 3.

In view of the above, the inventors have adopted a method in which the rotational speed of the intermediate rollers 22 is higher than the rotational speed of the conveyance rollers 23. According to this method, the intermediate rollers 22 feed the sheet P over a larger amount than the conveyance rollers 23. Therefore, as shown in FIG. 5, an excess portion of the sheet P is caused in the path 25*a* formed by the guide 25, between the intermediate rollers 22 and the conveyance rollers 23 along the conveyance path. Such control makes it possible to avoid the sheet P from coming into contact with the guide 25 and becoming taut. Therefore, it is possible to prevent the conveyance rollers 23 from slipping over the sheet P and thus suppress the risk of deterioration in the quality of image formation by the head 5.

In the first illustrative embodiment, in order to appropriately adjust the rotational speed of the intermediate rollers 22, a phenomenon (hereinafter, which may be referred to simply as "slipping") of the intermediate rollers 22 slipping over the sheet P is further taken into consideration. Due to factors on a side upstream of the intermediate rollers 22 in the conveyance direction, the sheet P may be pulled upstream at the intermediate rollers 22, thereby causing the intermediate rollers 22 to slip over the sheet P. For instance, when the sheet P is the roll paper Rp, and a relatively large amount of roll paper Rp remains in the roll body Rb, the roll body Rb is heavy. Hence, a force required to pull the roll paper Rp out of the roll body Rb is also relatively large. Further, when the force required to pull the roll paper Rp out of the roll body Rb is large, the roll paper Rp becomes so taut to lift the pick-up roller 21*r*. In this case, a force applied to the roll paper Rp by the pick-up roller 21*r* becomes larger. Thus, when the remaining amount of roll paper Rp in the roll body Rb is relatively large, a force to pull the sheet P upstream is larger than when the remaining amount of roll paper Rp in the roll body Rb is relatively small. Therefore, in this case, the intermediate rollers 22 are more likely to slip over the sheet P. In addition, when the sheet P is the cut paper Kp, the pick-up roller 21*r* changes its position depending on an amount of the sheet P remaining on an upstream side of the pick-up roller 21*r* in the conveyance direction. Hence, in substantially the same manner as described above, there may be a case where since a force to pull the sheet P upstream at the intermediate rollers 22 becomes larger, the intermediate rollers 22 are more likely to slip over the sheet P.

The controller 9 performs a process of controlling the rotational speeds of the intermediate rollers 22 and the conveyance rollers 23 in consideration of the occurrence of the slipping as follows. First, a series of processes up to image formation by the controller 9 will be described with reference to FIG. 6.

Based on the result of the detection by the leading end position sensor 81, the controller 9 causes the pick-up roller unit 21 to feed the sheet P until the leading end of the sheet P reaches the intermediate rollers 22 (S1). Next, based on the result of the detection by the leading end position sensor 82, the controller 9 causes the pick-up roller unit 21 and the intermediate rollers 22 to convey the sheet P until the leading end of the sheet P reaches the conveyance rollers 23 (S2). Moreover, based on the result of the detection by the rotary encoder 83 during the execution of S2, the controller 9 obtains the number of rotations (i.e., a rotational quantity) of the intermediate rollers 22 during a period of time from when the leading end of the sheet P has reached the intermediate rollers 22 until when the leading end of the sheet P reaches the conveyance rollers 23 (S2).

Next, the controller 9 obtains the number $X_{MID}$ of rotations of the intermediate rollers 22 per single conveyance process in the image formation to be performed later, based on the following Formulas 1 and 2 (S3).

$$R = \frac{L_{Act} - L_{Set}}{L_{Set}} \quad \text{(Formula 1)}$$

$$X_{MID} = (X_{PF} + X_{BF})(1 + R) \quad \text{(Formula 2)}$$

In Formula 1, R represents a slip ratio, which is an evaluation value indicating a degree of slipping that occurs in the intermediate rollers 22. $L_{Act}$ represents a feed amount of the sheet P fed by the intermediate rollers 22 in S2. $L_{Act}$ is calculated based on the number of rotations of the intermediate rollers 22 indicated by the result of the detection by the rotary encoder 83 and the above conversion data stored in the ROM 92. $L_{Set}$ represents a reference value of the feed amount of the sheet P fed by the intermediate rollers 22 under the assumption that there is no slipping. $L_{Set}$ is obtained from the ROM 92. It is preferable that $L_{Set}$ be set to a practically appropriate value based on simulations and/or experiments in such a manner that R does not take a negative value. For instance, assuming that the sheet P passes substantially the center in a width direction of the path 25*a* as shown in FIG. 3, $L_{Set}$ may be set according to a length of the sheet P in such a state from the intermediate rollers 22 to the conveyance rollers 23. As described above, $L_{Set}$ is set in such a manner that R does not take a negative value. Therefore, R is equal to or more than zero. A larger value of R indicates that $L_{Act}$ is greater than $L_{Set}$, i.e., the degree of slipping is greater.

In Formula 2, $X_{MID}$ represents the number of rotations of the intermediate rollers 22 per single conveyance process in the image formation. $X_{PF}$ represents the number of rotations of the conveyance rollers 23 per single conveyance process in the image formation. $X_{BF}$ represents an increase of the number of rotations of the intermediate rollers 22 relative to the number of rotations of the conveyance rollers 23 per single conveyance process in the image formation. Due to the above increase, an excess portion of the sheet P is generated in the path 25*a* in each single conveyance process, and the amount of the excess portion accumulates as the conveyance process is repeated in the image formation as described below. Hereafter, such an accumulated amount of the excess portion of the sheet P in the path 25*a* will be referred to as "buffer." Further, a value representing the accumulated amount of the excess portion will be referred to as a "buffer value." (1+R) ($=L_{Act}/L_{Set}\geq 1$) represents a correction factor that takes into account the slipping of the intermediate rollers 22. Therefore, $X_{MID}$ corresponds to a value resulting from correcting, using the slip ratio R, the number of rotations obtained by adding $X_{BF}$ to $X_{PF}$ (i.e., the number of rotations of the conveyance rollers 23). When the slipping of the intermediate rollers 22 occurs, (1+R) is more than 1. Therefore, $X_{MID}$ is more than ($X_{PF}+X_{BF}$). The calculated $X_{MID}$ is stored in the RAM 93.

Next, the controller 9 performs skew correction (S4). The skew correction is a process of suppressing the sheet P from being fed by the conveyance rollers 23 in a state where the leading end of the sheet P is inclined at an angle to a direction (i.e., the scanning direction) along which the conveyance rollers 23 extend. Specifically, in the skew correction, the controller 9 causes the intermediate rollers 22 to feed the sheet P by a particular amount in a state where the leading end of the sheet P is in contact with the conveyance rollers 23, while prohibiting the conveyance rollers 23 from rotating or while rotating the conveyance rollers 23 in respective rotational directions opposite to rotational directions for feeding the sheet P to the head 5. Thus, the sheet P is pressed against the conveyance rollers 23 while being bent in the path 25*a*, thereby making the leading end of the sheet P parallel to the extending direction of the conveyance rollers 23.

Next, the controller 9 performs initial sheet placement (S5). The initial sheet placement is a process of causing the intermediate rollers 22 and the conveyance rollers 23 to feed the sheet P by a particular amount. Thereby, the sheet P is fed from the conveyance rollers 23, and is placed in a position for the head 5 to perform an initial scanning process. Here, the number of rotations of the intermediate rollers 22 is set smaller than the number of rotations of the conveyance rollers 23 to reduce the bending of the sheet P caused by the skew correction. The bending of the sheet P that remains as a result of the initial sheet placement corresponds to an initial state of the buffer.

Next, the controller 9 obtains an initial setting value for the buffer value from the ROM 92, and stores the obtained value as an initial buffer value in the RAM 93 (S6). The initial setting value is set according to a size of the buffer in the initial state, which corresponds to the aforementioned bending that remains in the path 25*a* after execution of S4 and S5. Specifically, the initial setting value is set to a value obtained by subtracting an amount by which the buffer is reduced in size during the initial sheet placement from the size of the buffer generated during the skew correction.

Next, the controller 9 performs image formation based on $X_{MID}$ calculated in S3 and the initial buffer value set in S6 (S7). The image formation will be described in detail below. After completion of the image formation, the controller 9 terminates the series of processes shown in FIG. 6.

The details of the image formation are described below with reference to FIG. 7. In the image formation, the controller 9 first performs a scanning process (S11). Specifically, in S11, the controller 9 performs a single path of image formation by causing the head 5 to eject ink from the plurality of nozzles 51 onto the sheet P while causing the moving mechanism 6 to move the carriage 4 in the scanning direction. Next, the controller 9 determines whether the buffer value stored in the RAM 93 has exceeded a threshold $T_{BF}$ (S12). It is noted that the threshold $T_{BF}$ may be adjusted based on the result of the sheet type determination. For instance, when the sheet P is the roll paper Rp, the threshold $T_{BF}$ may be set to a larger value than when the sheet P is the cut paper Kp. When determining that the buffer value stored in the RAM 93 has not exceeded the threshold $T_{BF}$ (S12: No), the controller 9 performs the conveyance process using $X_{MID}$ (S13). Hereinafter, this conveyance process may be referred to as the "normal conveyance process."

In the normal conveyance process, the controller 9 rotates the intermediate rollers 22 by the number $X_{MID}$ of rotations, and at the same time, rotates the conveyance rollers 23 by the number $X_{PF}$ of rotations. The intermediate rollers 22 and the conveyance rollers 23 are rotated at their respective rotation numbers during the same period of time. Therefore, regarding a rotational speed, i.e., the number of rotations per unit time, the rotational speed of the intermediate rollers 22 rotating by the number $X_{MID}$ of rotations, which is larger than $X_{PF}$, is higher than that of the conveyance rollers 23 rotating by the number $X_{PF}$ of rotations. In addition, the intermediate rollers 22 rotate by the number $X_{MID}$ of rotations that has the value obtained by correcting ($X_{PF}+X_{BF}$) using the slip ratio R. Therefore, it is likely with improved certainty that even if the slipping of the intermediate rollers 22 occurs, the feed amount of the sheet P fed by the intermediate rollers 22 is larger than that by the conveyance rollers 23. The feed amount of the sheet P is close to the amount of the sheet P fed when the intermediate rollers 22 are rotated by the number ($X_{PF}+X_{BF}$) of rotations with no slipping. Thereby, the excess portion of the sheet P that has an amount substantially corresponding to $X_{BF}$ is generated in each single conveyance process.

Next, the controller 9 adds $X_{BF}$ to the buffer value stored in the RAM 93, thereby obtaining an accumulated value of the buffer value (S16). In the first execution of S16, the addition of $X_{BF}$ is made to the initial buffer value set in S6 of FIG. 6. As described above, $X_{BF}$ substantially corresponds to the amount of the excess portion of the sheet P that is generated in each normal conveyance process of S13. Each time the normal conveyance process of S13 is completed, $X_{BF}$ is cumulatively added to the buffer value in S16. Thus, the buffer value reflects the size of the buffer in the path 25*a* that is accumulated in every conveyance process.

Next, the controller 9 determines whether the image formation has been completed by executing a required number of scanning processes and conveyance processes (S17). When determining that the image formation has been completed (S17: Yes), the controller 9 terminates a series of processes shown in FIG. 7. When determining that the image formation has not been completed (S17: No), the controller 9 goes back to S11 to perform a next scanning process and a next conveyance process.

Returning to S12, when the buffer value stored in the RAM 93 has exceeded the threshold $T_{BF}$ (S12: Yes), the controller 9 performs a conveyance process using $X^*_{MID}$ expressed by the following Formula 3 (S14). $S_{BF}$ in Formula 3 corresponds to the buffer value. $B_{TGT}$ corresponds to a target buffer value of the buffer to be generated in the path 25*a* immediately after a conveyance process in S14. Hereinafter, this conveyance process will be referred to as the "buffer clear conveyance process." Thus, $X_{BF}$ is added to the buffer value each time the normal conveyance process is performed, and the buffer clear conveyance process is performed each time the buffer value exceeds the threshold $T_{BF}$. Therefore, the buffer clear conveyance process is performed every time the number of times the normal conveyance process has been performed reaches a particular number of times.

$$X^*_{MID}=(X_{PF}+X_{BF}-S_{BF}+B_{TGT})(1+R) \quad \text{(Formula 3)}$$

In the buffer clear conveyance process, the controller 9 rotates the intermediate rollers 22 by the number $X^*_{MID}$ of rotations, and at the same time, rotates the conveyance rollers 23 by the number $X_{PF}$ of rotations. Thereby, in the buffer clear conveyance process, the number of rotations of the intermediate rollers 22 is smaller by $(1+R)*(S_{BF}-B_{TGT})$ than in the normal conveyance process of S13. As described above, the buffer value indicated by $S_{BF}$ reflects the size of the buffer in the path 25*a*. Accordingly, $(1+R)*S_{BF}$ corresponds to the number of rotations required for the intermediate rollers 22 to feed the sheet P by an amount corresponding to the buffer in the path 25*a* that takes into account the case where the slipping of the intermediate rollers 22 occurs. Therefore, when the intermediate rollers 22 are rotated by the number $X^*_{MID}$ of rotations, it is possible to once reduce the buffer generated in the path 25*a* by the term "$-S_{BF}*(1+R)$" and set the buffer value after the reduction to an appropriate amount (i.e., an amount corresponding to $B_{TGT}$).

Next, the controller 9 resets the buffer value stored in the RAM 93 to $B_{TGT}$ (S15). Then, the controller 9 executes S16 and subsequent steps.

Figure 8B:
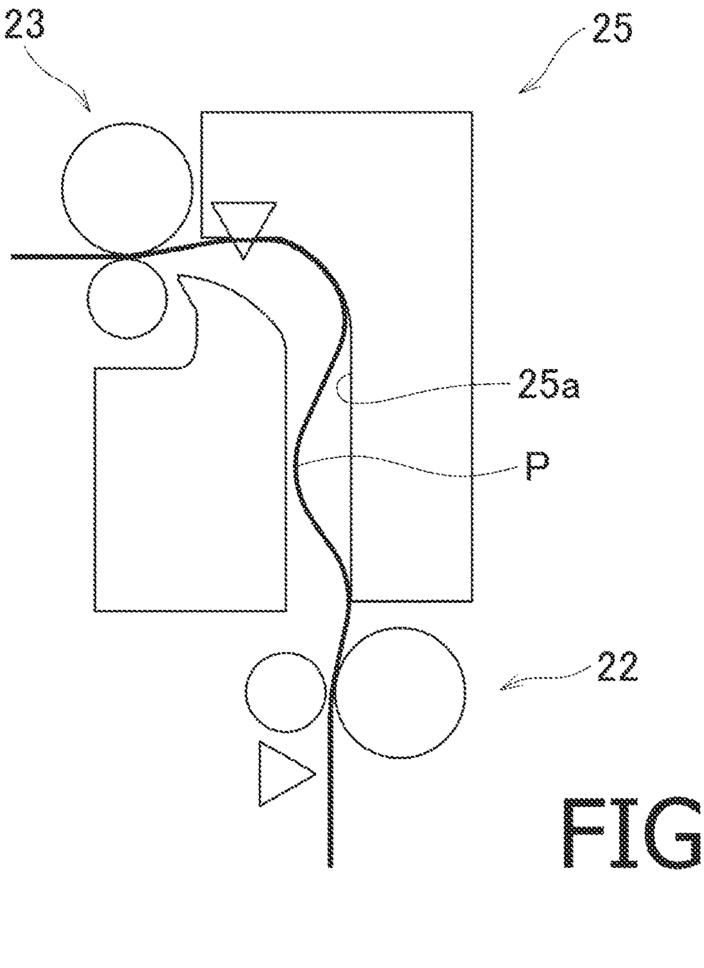
FIG. 8B is a cross-sectional side view schematically showing a state where the sheet sticks to an inner surface of the path defined by the guide and is bent in the path.

According to the first illustrative embodiment described above, the buffer is generated in the path 25*a* in the normal conveyance process (se S13 in FIG. 7). As the normal conveyance process is repeatedly performed, the buffer becomes larger in the path 25*a*. If the buffer becomes too large, the sheet P might stick to the inner surface of the path 25*a* and/or be bent strongly in the path 25*a* as shown in FIG. 8B. Moreover, if the force of the intermediate rollers 22 pushing the sheet P toward the conveyance rollers 23 becomes excessively large, and the conveyance rollers 23 feed the sheet P over an excessive amount toward the head 5, it might result in deteriorated quality of image formation by the head 5.

In view of the above problems, the controller 9 obtains the accumulated value of the buffer value (S16 in FIG. 7) by cumulatively adding $X_{BF}$ to the buffer value stored in the RAM 93 each time the normal conveyance process is completed, and performs the buffer clear conveyance process (S14 in FIG. 7) when the buffer value has exceeded the threshold $T_{BF}$. Thereby, it is possible to once reduce the buffer generated in the path 25*a*. Therefore, it is possible to avoid the buffer from becoming too large and suppress the deterioration in the quality of image formation.

Cumulatively adding $X_{BF}$ each time the normal conveyance process is performed is equivalent to multiplying $X_{BF}$ by the number of times the normal conveyance process is executed. Therefore, in determining whether to perform the buffer clear conveyance process, instead of comparing with the threshold $T_{BF}$ the buffer value obtained by accumulating $X_{BF}$ as shown in FIG. 7, $X_{BF}$ multiplied by the number of execution times of the normal conveyance process may be compared with another threshold. Here, when the said another threshold is a value obtained by subtracting the initial buffer value from $T_{BF}$, the former comparison and the latter comparison are equivalent to each other. Namely, the number of times the normal conveyance process is executed before the buffer clear conveyance process is executed in the case where the former comparison is employed is equal to that in the case where the latter comparison is employed.

In the aforementioned first illustrative embodiment, $X_{BF}$ is cumulatively added to the initial buffer value (see S6 in FIG. 6), which corresponds to the initial state of the buffer generated by the skew correction (S4 in FIG. 6) and the initial sheet placement (S5 in FIG. 6). Then, when the buffer value exceeds the threshold $T_{BF}$, the buffer clear conveyance process is performed to reduce the buffer. Therefore, it is possible to reduce the buffer at the appropriate timing even when the skew correction and the initial sheet placement are performed.

In the first illustrative embodiment, based on the result of the detection by the rotary encoder 83, the controller 9 obtains $L_{Act}$ corresponding to an actual value of the number of rotations of the intermediate rollers 22 in the case where the controller 9 causes the intermediate rollers 22 to feed the sheet P from when the leading end of the sheet P has reached the intermediate rollers 22 until the leading end of the sheet P reaches the conveyance rollers 23. Then, the controller 9 calculates the slip ratio R based on Formula 1. $L_{Set}$ in Formula 1 represents the reference value (i.e., a theoretical value) of the feed amount of the sheet P under the assumption that the intermediate rollers 22 feed the sheet P in substantially the same manner as above with no slipping. The controller 9 calculates the slip ratio R that indicates the relationship between $L_{Set}$ and $L_{Act}$, thereby evaluating a difference between the case where the slipping of the intermediate rollers 22 occurs and the case where no slipping occurs.

Then, in each single conveyance process, the controller 9 rotates the intermediate rollers 22 by the number $X_{MID}$ of rotations expressed by Formula 2 using the slip ratio R, and at the same time, rotates the conveyance rollers 23 by the number $X_{PF}$ of rotations. As shown in Formula 2, the slip ratio R is used to correct $(X_{PF}+X_{BF})$. Hence, even under the assumption that the slipping of the intermediate rollers 22 occurs, it is possible to appropriately set the number $X_{MID}$ of rotations of the intermediate rollers 22 for the number $X_{PF}$ of rotations of the conveyance rollers 23, depending on the slipping situation. Thus, by appropriately reflecting the slipping situation in the adjustment of the rotational speed of the intermediate rollers 22, it is possible to secure an appropriate feed amount of the sheet P to be fed by the intermediate rollers 22 for the feed amount of the sheet P to be fed by the conveyance rollers 23.

Further, in the aforementioned first illustrative embodiment, when the level of the threshold $T_{BF}$ is adjusted based on the result of the determination of the sheet type, the following advantageous effects are produced. There is a risk that some factors, which are not reflected in the slip ratio R, might cause a deviation from the assumed value of the conveyance amount of the sheet P conveyed. Such factors may include, but are not limited to, occurrence of slipping of other rollers (e.g., the conveyance rollers 23) to convey or feed the sheet P than the intermediate rollers 22. On the other hand, a total feed amount of a single sheet fed by the individual rollers may be larger when the single sheet is the roll paper Rp than when the single sheet is the cut paper Kp. Therefore, when the aforementioned deviation is caused, the roll paper Rp, which has a larger total feed amount, is more likely to cause the deviation to accumulate than the cut paper Kp, thereby resulting in a higher risk that the buffer in the path 25*a* may be insufficient. Therefore, as described above, by setting the threshold $T_{BF}$ higher in the case of the roll paper Rp than in the case of the cut paper Kp, the number of execution times of the normal conveyance process before the buffer clear conveyance process is executed becomes larger. This ensures that the buffer is relatively large in the case of the roll paper Rp. Thus, it is possible to suppress the insufficient buffer that may be caused in the case of the roll paper Rp.

Second Illustrative Embodiment

Figure 9:
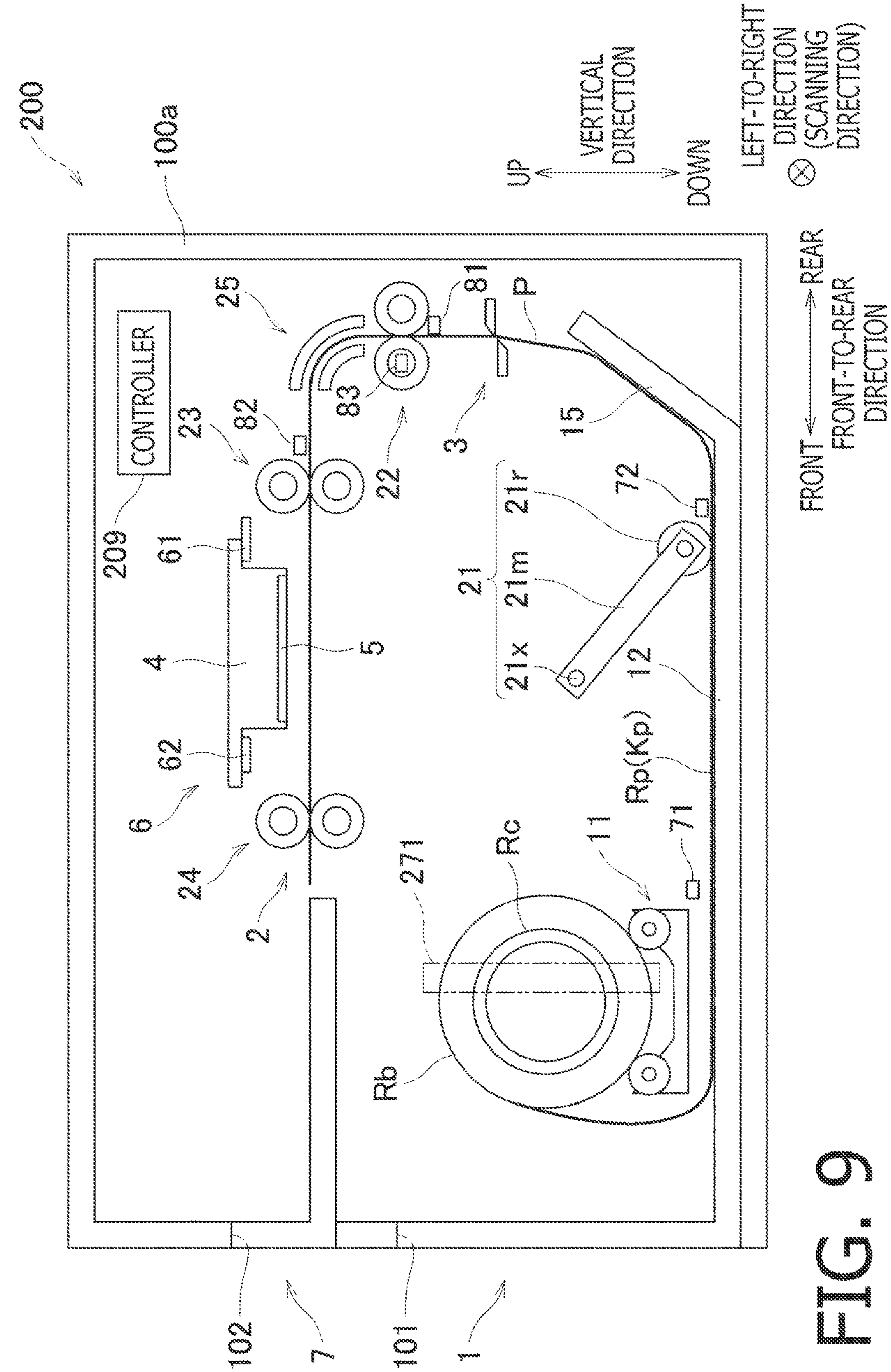
FIG. 9 is a cross-sectional side view schematically showing a configuration of a printer.

A printer 200 of a second illustrative embodiment according to aspects of the present disclosure will be described with reference to FIG. 9. Differences between the printer 200 of the second illustrative embodiment and the printer 100 of the first illustrative embodiment include that the printer 200 has a sheet remaining amount sensor 271 and a controller 209. Major differences between the controller 209 of the second illustrative embodiment and the controller 9 of the first illustrative embodiment include that R* expressed by the after-mentioned Formula 4 is used for the controller 209 to control the rotational speed of the intermediate rollers 22 instead of R expressed by Formula 1. In addition, in calculating R*, the controller 209 performs the following determination processes and calculation processes based on the result of the detection by each sensor. With respect to the other configurations and functions than the above differences, the printer 200 may have substantially the same ones as those of the printer 100.

The sheet remaining amount sensor 271 includes a plurality of optical sensors. Each optical sensor includes a light emitting element and a light receiving element that are arranged to sandwich therebetween the roll body Rb supported by the roll body supporter 11 in the left-to-right direction. The plurality of optical sensors are arranged along the vertical direction to form a sensor array. Each optical sensor is configured to detect whether light emitted from the light emitting element toward the light receiving element has been received by the light receiving element, and transmit the detection result to the controller 209. When the roll body Rb is present on an optical path of each optical sensor, the roll body Rb blocks the light receiving element from receiving the light emitted by the light emitting element. Therefore, based on the results of the detection by the entire sensor array, the controller 209 is enabled to determine in which range in the vertical direction the roll body Rb exists. Which range the roll body Rb exists in varies depending on a remaining amount of the roll paper Rp wound around the core member Rc. In the second illustrative embodiment, the controller 209 is configured to obtain the remaining amount of the roll paper Rp in the roll body Rb in accordance with the results of the detection by the sheet remaining amount sensor 271.

The controller 209 is further configured to calculate a cumulative used length of the paper roll Rp that has been used since the roll paper Rp on the roll body supporter 11 began to be first unwound and used. The above calculation is made based on the results of the detection, e.g., by the roll body sensor 71 and the rotary encoder 83. Specifically, based on the result of the detection by the roll body sensor 71, the controller 209 detects that the roll body supporter 11 has been switched from a state where the roll body supporter 11 has no roll paper Rp supported thereon to a state where the roll body supporter 11 has the roll paper Rp supported thereon. Thereby, it is detected that the roll paper Rp has been first unwound and used. Next, based on the results of the detection by the rotary encoder 83, the controller 209 calculates a cumulative length of the roll paper Rp that has been fed by the intermediate rollers 22 since the roll paper Rp was first unwound and used. The calculated cumulative length of the roll paper Rp that has been fed by the intermediate rollers 22 is used as the cumulative used length of the roll paper Rp.

Then, the controller 209 calculates R* expressed by the following Formula 4. Using the calculated R* instead of R used in the control by the controller 9, the controller 209 performs similar processing to the processing by the controller 9 based on Formulas 1 to 3.

$$R^* = R + \alpha + \beta + \gamma + \delta \quad \text{(Formula 4)}$$

In Formula 4, R is the same as R expressed by Formula 1. α, β, γ, and δ are correction coefficients. These correction coefficients are used to correct a deviation, caused by some factors (e.g., slipping of the conveyance rollers 23) that are not fully reflected in the slip ratio R of Formula 1, from the assumed value of the conveyance amount of the sheet P. The above deviation varies depending on the characteristics and usage status of the sheet P, the quality of image formation, and a time elapsed since the printer 200 began to be used. For instance, the characteristics of the sheet P may include, but are not limited to, an application-related type (e.g., plain paper or glossy paper) of the sheet P. In addition, what the usage status of the sheet P represents may include, but is not limited to, the remaining amount of the roll paper Rp in the roll body Rb, and the number of sheets printed. Each correction coefficient is set to adjust the slip ratio R according to these factors which cause the variation in the deviation, as follows.

Here, α has a value depending on the application-related type of the sheet P. For instance, when plain paper or glossy paper is selectively used as the sheet P, the value of α is set according to how easily the materials of these sheet types cause the slipping. In addition, β has a value according to the quality of image formation. For instance, when one of available options (e.g., high-speed image formation and high-quality image formation) is selectable as the quality of image formation, a conveyance speed at which the sheet P is conveyed may be changed according to these options. In such a case, the higher the conveyance speed for the sheet P is, the higher the risk of slipping is. Thus, β is set to be larger as the conveyance speed for the sheet P is higher.

In addition, when the sheet P is the roll paper Rp, γ has a value according to a remaining amount of the roll paper Rp in the roll body Rb that is obtained based on the results of the detection by the sheet remaining amount sensor 271. For instance, as the remaining amount of the roll paper Rp in the roll body Rb is larger, the tension applied to the roll paper Rp unwound and drawn from the roll body Rb is likely to be higher, and the slipping is more likely to be caused. Therefore, γ is set to be larger as the remaining amount of the roll paper Rp is larger. It is noted that in another instance, γ may be set using the cumulative used length of the roll paper Rp instead of the remaining amount of the roll paper Rp. When the cumulative used length of the roll paper Rp is used, a larger cumulative used length of the roll paper Rp corresponds to a smaller remaining amount of the roll paper Rp in the roll body Rb. In yet another instance, with respect to a single sheet P on which image formation is being performed, the value of γ may be set according to a length of the sheet P conveyed by the intermediate rollers 22.

In addition, δ has a value depending on the number of sheets printed and the time elapsed since the printer 200 began to be used. For instance, the controller 209 stores in the ROM 92 a cumulative number of sheets printed, and calculates the time elapsed since the printer 200 began to be used based on a built-in timer. A larger number of sheets printed or a longer time elapsed indicates that each element included in the printer 200 is more deteriorated over time. As each element included in the printer 200 is more deteriorated over time, the slipping of the rollers is more likely to be caused, and/or the operations of the rollers under the control based on Formulas 1 to 3 are more likely to fluctuate. Therefore, the controller 209 sets δ to a value according to the number of sheets printed and/or the time elapsed since the printer 200 began to be used.

Thus, in the second illustrative embodiment, it is possible to appropriately correct the slip ratio R to be a value according to various factors that are not fully reflected in the slip ratio R expressed by Formula 1, based on Formula 4.

Third Illustrative Embodiment

A third illustrative embodiment according to aspects of the present disclosure will be described. Differences between a printer of the third illustrative embodiment and the printer 100 of the first embodiment include that in the processes shown in FIGS. 6 and 7, the printer of the third illustrative embodiment does not make any correction using the slip ratio R, and instead performs the following control. Such control may be employed when no slipping occurs of the intermediate rollers 22, or the slipping, even if occurs, is small. The other configurations and functions of the printer in the third illustrative embodiment may be substantially the same as those of the printer 100 in the first illustrative embodiment, and therefore, the same reference numerals will be used therefor, and explanations thereof may be omitted as appropriate.

The controller of the third illustrative embodiment executes S1, S2, and S4 to S7 (i.e., all of the steps S1 to S7 shown in FIG. 6 from which S3 is excluded) in sequence as shown in FIG. 6. In addition, the controller of the third illustrative embodiment executes the steps S11 to S17 shown in FIG. 7, of which the processing contents of S13 to S16 are changed as follows. In S13, $X_{MID}$ expressed by the following Formula 5 is used as the number of rotations of the intermediate rollers 22 instead of $X_{MID}$ expressed by the aforementioned Formula 2. In Formula 5, p is a real number greater than 1 and represents the rate of increase in $X_{MID}$ relative to the number $X_{PF}$ of rotations of the conveyance rollers 23. Further, in S16, ΔX expressed by the following Formula 6 is cumulatively added to the buffer value stored in the RAM 93 instead of $X_{BF}$ being cumulatively added thereto. ΔX corresponds to the amount of the excess portion of the sheet P that is generated in the path 25*a* per single normal conveyance process. Moreover, in S14, $X_{RST}$ expressed by the following Formula 7 is used as the number of rotations of the intermediate rollers 22 instead of $X^*_{MID}$ expressed by the aforementioned Formula 3. In Formula 7, $B_{TGT}$ corresponds to a target buffer value of the buffer to be generated in the path 25*a* immediately after the buffer clear conveyance process.

$$X_{MID}=\rho\times X_{PF} \quad \text{(Formula 5)}$$

$$\Delta X=X_{MID}-X_{PF} \quad \text{(Formula 6)}$$

$$X_{RST}=X_{MID}-S_{BF}+B_{TGT} \quad \text{(Formula 7)}$$

In the third illustrative embodiment, similarly to the first illustrative embodiment, ΔX is cumulatively added to the buffer value stored in the RAM 93 each time the normal conveyance process is completed (S16 in FIG. 7). Then, when the buffer value exceeds the threshold $T_{BF}$, the buffer clear conveyance process (S14 in FIG. 7) is performed. Thereby, it is possible to once reduce the buffer generated in the path 25*a* and thereafter set the buffer value to an appropriate amount (corresponding to $B_{TGT}$). Thus, it is possible to avoid the buffer from becoming too large.

Fourth Illustrative Embodiment

A fourth illustrative embodiment according to aspects of the present disclosure will be described. In the fourth illustrative embodiment, $X^*_{MID}$ and $X^*_{RST}$ expressed by the following Formulas 8 and 9, respectively, are used instead of $X_{MID}$ and $X_{RST}$ expressed by the aforementioned Formulas 5 and 7, respectively, in the third illustrative embodiment. In Formulas 8 and 9, S is a correction coefficient. Further, a is a correction factor according to the application-related type of the sheet P. β is a correction factor according to the material of the sheet P and/or the quality of image formation. γ is a correction factor according to the remaining amount of the sheet P (e.g., the remaining amount of the roll paper Rp in the roll body Rb). δ is a correction factor according to the number of sheets printed and/or the time elapsed since the printer of the fourth illustrative embodiment began to be used. The values of these correction factors are set based on substantially the same concepts as when α, β, γ and δ are set in the aforementioned second illustrative embodiment. Even if the controller of the fourth illustrative embodiment attempts to rotate the intermediate rollers 22 by the number $X_{MID}$ or $X_{RST}$ of rotations, an actual conveyance amount of the sheet P may deviate from a value expected from the above number of rotations. Factors that may cause such deviation include the application-related type of the sheet P, the material of the sheet P, the quality of image formation, the remaining amount of the sheet P, the number of sheets printed, and the time elapsed since the printer of the fourth illustrative embodiment began to be used. By correcting the number of rotations using the correction coefficient S according to these factors, it is possible to suppress occurrence of the above deviation.

$$X^*_{MID}=S\times X_{MID} \quad \text{(Formula 8)}$$

$$X^*_{RST}=S\times X_{RST} \quad \text{(Formula 9)}$$

$$S=\alpha\times\beta\times\gamma\times\delta \quad \text{(Formula 10)}$$

Modifications

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

For instance, in the aforementioned first illustrative embodiment, $L_{Act}$ in Formula 1 represents the practical feed amount of the sheet P fed by the intermediate rollers 22, and is calculated based on the result of the detection by the rotary encoder 83. Instead of $L_{Act}$, in another instance, the number itself of rotations of the intermediate rollers 22 as indicated by the result of the detection by the rotary encoder 83 may be used. In this case, instead of $L_{Set}$, a reference value of the number of rotations of the intermediate rollers 22 may be used.

For instance, in the aforementioned first illustrative embodiment, $L_{Act}$, which corresponds to the actual value of the number of rotations of the intermediate rollers 22 in the case where the sheet P is fed by the intermediate rollers 22 from when the leading end of the sheet P has reached the intermediate rollers 2 until the leading end of the sheet P reaches the conveyance rollers 23, is obtained based on the result of the detection by the rotary encoder 83. Then, the relationship in the above case between $L_{Set}$, which is the theoretical value of the feed amount of the sheet P to be fed by the intermediate rollers 22, and $L_{Act}$ is obtained as the slip ratio R. Instead, in another instance, a theoretical value of the number of rotations of the intermediate rollers 22, and a practical value of the feed amount of the sheet P fed by the intermediate rollers 22 may be obtained.

The following provides a specific configuration example. A sheet status obtaining device is disposed, which is configured to emit laser light to be incident to the sheet P and the path 25*a*, thereby obtaining a status of the sheet P in the path 25*a* such as an amount of the sheet P fed into the path 25*a*. Then, after the leading end of the sheet P has reached the intermediate rollers 22, the controller 9 causes the intermediate rollers 22 to rotate by a preset value (i.e., a theoretical value) of the number of rotations and feed the sheet P. At this time, based on the status of the sheet P in the path 25*a* as obtained by the sheet status obtaining device, the controller 9 calculates a practical value of the feed amount of the sheet P fed by the intermediate rollers 22. Furthermore, based on the calculation result, the controller 9 evaluates a difference between the case where the intermediate rollers 22 are considered to slip over the sheet P and the case where the intermediate rollers 22 are assumed to not slip over the sheet P. Specifically, the controller 9 evaluates the difference between the calculated value of the feed amount of the sheet P, and the reference value of the feed amount of the sheet P under the assumption that the intermediate rollers 22 are rotated by the above preset value of the number of rotations without slipping. In yet another instance, the above difference may be evaluated by calculating a slip ratio R' in the case where the calculated value of the feed amount of the sheet P is used instead of $L_{Act}$ in Formula 1, and the reference value of the feed amount of the sheet P is used instead of $L_{Set}$.

For instance, in the aforementioned first illustrative embodiment, the slip ratio R is calculated each time image formation is performed on a single sheet P. In another instance, contrast, the slip ratio R may be obtained at the stage of manufacturing the printer 100 or of first using the printer 100 after manufacturing. In this case, R once obtained may be stored in the ROM 92, and R stored in the ROM 92 may continue to be used at all times in subsequent image formations.

For instance, in the aforementioned first illustrative embodiment, the buffer is once reduced in the buffer clear conveyance process in which the intermediate rollers 22 are rotated by the number $X^*_{MID}$ of rotations. In another instance, however, instead of the buffer clear conveyance process, a process to once decrease the buffer by rotating the intermediate rollers 22 with the number of rotations smaller than $X_{MID}$ but larger than $X^*_{MID}$ may be performed.

In each of the aforementioned illustrative embodiments, aspects of the present disclosure have been applied to the printer 100 or 200. However, examples to which aspects of the present disclosure are applicable are not limited to the ones illustrated in the aforementioned illustrative embodiments. Aspects of the present disclosure may be applied to other image forming apparatuses such as multi-function peripherals and copy machines as long as they include print engines such as an inkjet print engine configured to eject ink from a head, a laser print engine, or a thermal print engine.

In the aforementioned illustrative embodiments, to form an excess portion of the sheet P in the path 25*a* between the intermediate rollers 22 and the conveyance rollers 23 along the conveyance path, the method is adopted in which the rotational speed of the intermediate rollers 22 is made higher than the rotational speed of the conveyance rollers 23. Specifically, the number of rotations of the intermediate rollers 22 per single conveyance process is controlled to be larger than the number of rotations of the conveyance rollers 23 per single conveyance process. However, the method to form the excess portion of the sheet P is not limited to the above method but may be any other method as long as the feed amount of the sheet P fed by the intermediate rollers 22 per particular period of time is larger than that by the conveyance rollers 23. It is noted that hereinafter, the "feed amount per particular period of time" may be referred to as the "feeding rate" or the "feeding speed."

Suppose for instance that aspects of the present disclosure are applied to an image forming apparatus including a laser print engine, instead of the printer 100 or 200. In this case, the image formation (see S7 in FIG. 6) may be performed in accordance with a procedure shown in FIG. 10. It is noted that in FIG. 10, substantially the same steps as those in FIG. 7 will be represented with the same reference characters attached. Further, in this modification, substantially the same elements as illustrated in the aforementioned illustrative embodiments will be represented with the same reference characters attached. Moreover, in this modification, with respect to substantially the same processes and operations as described in the aforementioned illustrative embodiments, detailed explanations thereof will be omitted. Furthermore, in this modification, with respect to known elements used for known laser printing technologies, detailed explanations thereof will be omitted.

Figure 10:
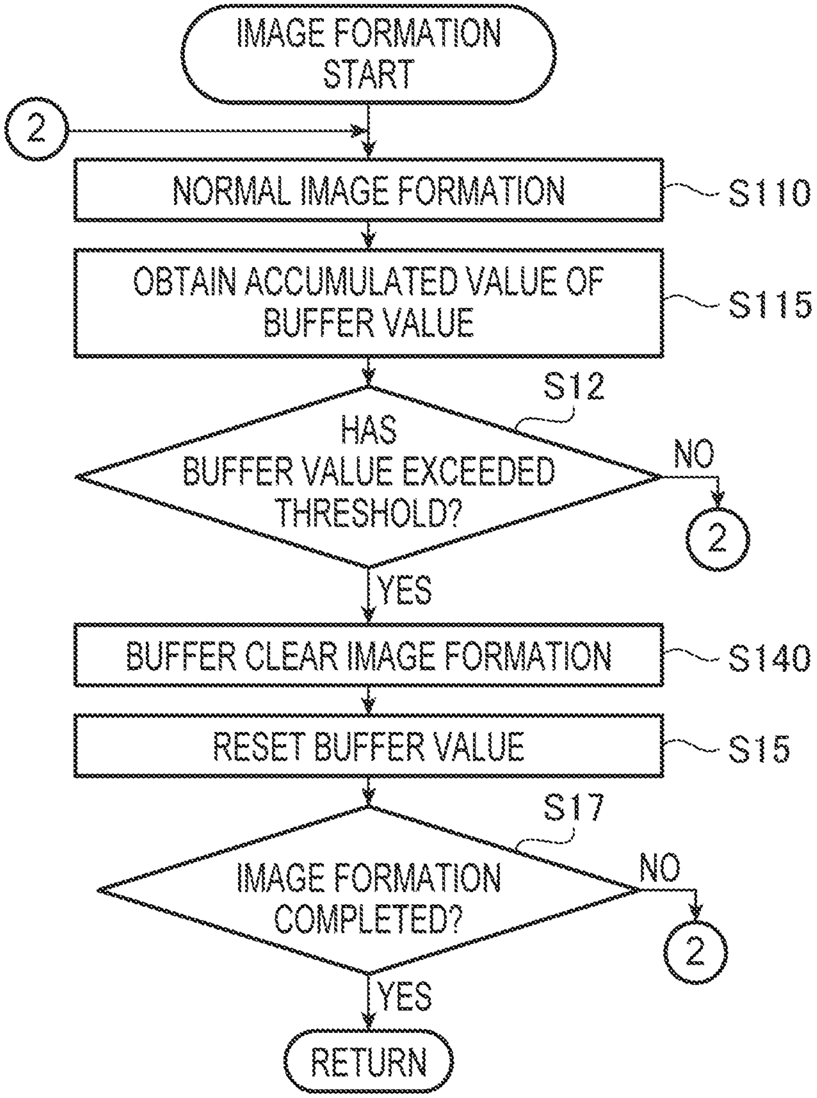
FIG. 10 is a flowchart showing a procedure of image formation.

As shown in FIG. 10, the controller 9 may first perform normal image formation (S110). Specifically, in S110, the controller 9 may perform the normal image formation by controlling the laser print engine to transfer a toner image formed on a photoconductive body (not shown) onto a sheet P while conveying the sheet P during a particular period of time (or by a particular conveyance amount), in such a manner that the feed amount of the sheet P fed by the intermediate rollers 22 per particular period of time is larger than that by the conveyance rollers 23. In this case, for instance, the intermediate rollers 22 and the conveyance rollers 23 may be controlled in substantially the same manner as in the normal conveyance process in S13 (see FIG. 7). Next, the controller 9 may obtain an accumulated value of the buffer value (S115). At this time, for instance, the accumulated value of the buffer value may be obtained in substantially the same manner as in S16 (see FIG. 7). Thereafter, the controller 9 may proceed to S12. When determining in S12 that the buffer value has not exceeded a threshold (S12: No), the controller 9 may go back to S110.

Meanwhile, when determining that the buffer value has exceeded the threshold (S12: Yes), the controller 9 may proceed to S140 to perform buffer clear image formation. Specifically, in S140, the controller 9 may perform the buffer clear image formation by controlling the laser print engine to transfer the toner image formed on the photoconductive body onto the sheet P while conveying the sheet P during the particular period of time (or by the particular conveyance amount), in such a manner that the feed amount of the sheet P fed by the intermediate rollers 22 per particular period of time is smaller than that by the conveyance rollers 23. In this case, for instance, the intermediate rollers 22 and the conveyance rollers 23 may be controlled in substantially the same manner as in the buffer clear conveyance process in S14 (see FIG. 7). After completion of S140, the controller 9 executes S15 and S17. When determining in S17 that the image formation has not been completed (S17: No), the controller 9 may go back to S110. Meanwhile, when determining that the image formation has been completed (S17: Yes), the controller 9 may terminate a series of processes shown in FIG. 10.

It is noted that in this modification, the image forming apparatus may be configured to cause the conveyance rollers 23 to convey the sheet P by a particular conveyance amount in the normal image formation in S110 until the buffer value exceeds the threshold (S12: No). Namely, in this case, the buffer clear image formation in S140 may be performed each time the conveyance rollers 23 convey the sheet P by the particular conveyance amount during the continuous execution of the normal image formation in S110 (i.e., during the loop of S110 to S12: No).

In another instance, in S12, the controller 9 may determine whether an accumulated value of the feed amount of the sheet P fed by the intermediate rollers 22 in the normal image formation in S110 has exceeded a predetermined threshold value, instead of determining whether the accumulated value of the buffer value has exceeded the threshold. In this case, when the accumulated value of the feed amount of the sheet P fed by the intermediate rollers 22 in the normal image formation has not exceeded the predetermined threshold value (S12: No), the controller 9 may go back to S110 and continue to perform the normal image formation.

Meanwhile, when the accumulated value of the feed amount of the sheet P fed by the intermediate rollers 22 in the normal image formation has exceeded the predetermined threshold value (S12: Yes), the controller 9 may proceed to S140 and perform the buffer clear image formation. In this case, in an additional step or S115 following S110, the controller 9 may obtain the accumulated value of the feed amount of the sheet P fed by the intermediate rollers 22 in the normal image formation. Further, in this case, in an additional step or S15 following S140, the controller 9 may update (e.g., reset to zero) the accumulated value of the feed amount of the sheet P fed by the intermediate rollers 22.

In yet another instance, in S12, the controller 9 may determine whether an accumulated value of the feed amount of the sheet P fed by the conveyance rollers 23 in the normal image formation in S110 has exceeded a particular threshold value, instead of determining whether the accumulated value of the buffer value has exceeded the threshold. In this case, when the accumulated value of the feed amount of the sheet P fed by the conveyance rollers 23 in the normal image formation has not exceeded the particular threshold value (S12: No), the controller 9 may go back to S110 and continue to perform the normal image formation. Meanwhile, when the accumulated value of the feed amount of the sheet P fed by the conveyance rollers 23 in the normal image formation has exceeded the particular threshold value (S12: Yes), the controller 9 may proceed to S140 and perform the buffer clear image formation. In this case, in an additional step or S115 following S110, the controller 9 may obtain the accumulated value of the feed amount of the sheet P fed by the conveyance rollers 23 in the normal image formation. Further, in this case, in an additional step or S15 following S140, the controller 9 may update (e.g., reset to zero) the accumulated value of the feed amount of the sheet P fed by the conveyance rollers 23.

In the aforementioned illustrative embodiments, to reduce, in the buffer clear conveyance process (S14 in FIG. 7), the excess portion of the sheet P formed in the path 25*a* between the intermediate rollers 22 and the conveyance rollers 23 along the conveyance path, the method is adopted in which the rotational speed of the intermediate rollers 22 is made lower than the rotational speed of the conveyance rollers 23. Specifically, the number of rotations of the intermediate rollers 22 per single conveyance process is controlled to be smaller than the number of rotations of the conveyance rollers 23 per single conveyance process. However, the method to reduce the excess portion of the sheet P in the buffer clear conveyance process is not limited to the above method but may be any other method as long as the feed amount of the sheet P fed by the intermediate rollers 22 per particular period of time is smaller than that by the conveyance rollers 23. For instance, the intermediate rollers 22 may be stopped during the buffer clear conveyance process.

In the aforementioned illustrative embodiments, the controller 9 performs the initial sheet placement in S5 (see FIG. 6), in which the number of rotations of the intermediate rollers 22 is set smaller than the number of rotations of the conveyance rollers 23 to reduce the bending of the sheet P caused by the skew correction. The bending of the sheet P that remains as a result of the initial sheet placement corresponds to an initial state of the buffer. Thus, the controller 9 sets a small initial setting value for the buffer value in S6. Then, the controller 9 cumulatively increases the buffer value by repeatedly performing the normal conveyance process in S13 (see FIG. 7) until the accumulated value of the buffer value exceeds a threshold (e.g., an upper limit value of the buffer value) (S12: No), and reduces the buffer value by performing the buffer clear conveyance process in S14 when the accumulated value of the buffer value has exceeded the threshold (S12: Yes). However, the controller 9 may perform initial sheet placement in S5, in which the intermediate rollers 22 feed the sheet P by a larger feed amount than the conveyance rollers 23 to increase the bending of the sheet P caused by the skew correction. Namely, the controller 9 may set a large initial setting value for the buffer value in S6. Then, in this case, the controller 9 may gradually reduce the buffer value by repeatedly performing a second normal conveyance process until the buffer value falls below a second threshold (e.g., a lower limit value of the buffer value), and may increase (reset) the buffer value to the initial buffer value by performing a buffer forming conveyance process when the buffer value has fallen below the second threshold. Specifically, the controller 9 may determine whether the buffer value has fallen below the second threshold in S12 (see FIG. 7). When determining that the buffer value has not fallen below the second threshold (i.e., the buffer value has not become lower than the second threshold) (S12: No), the controller 9 may perform the second normal conveyance process in S13. In the second normal conveyance process, the feed amount of the sheet P fed by the intermediate rollers 22 per single conveyance process may be controlled to be smaller than that by the conveyance rollers 23. Meanwhile, when determining that the buffer value has fallen below the second threshold (i.e., the buffer value has become lower than the second threshold) (S12: Yes), the controller 9 may perform the buffer forming conveyance process in S14. In the buffer forming conveyance process, the feed amount of the sheet P fed by the intermediate rollers 22 per single conveyance process may be controlled to be larger than that by the conveyance rollers 23. After completion of the buffer forming conveyance process in S14, the controller 9 may reset the buffer value to the initial buffer value in S15. After S13 or S15, the controller 9 may obtain an updated value of the buffer value in S16.

The following shows examples of associations between elements illustrated in the aforementioned illustrative embodiments and modifications, and elements claimed according to aspects of the present disclosure. For instance, the printer 100 and the printer 200 may be included in examples of an "image forming apparatus" according to aspects of the present disclosure. The intermediate rollers 22 may be included in examples of a "first roller" according to aspects of the present disclosure. The conveyance rollers 23 may be included in examples of a "second roller" according to aspects of the present disclosure. The head 5 may be included in a "print engine" according to aspects of the present disclosure. In addition, the carriage 4 and the moving mechanism 6 may be included in the "print engine" according to aspects of the present disclosure. The controller 9 may be an example of a "controller" according to aspects of the present disclosure. The CPU 91 may be an example of a "processor" according to aspects of the present disclosure. The ROM 92 may be an example of a "non-transitory computer-readable storage medium" according to aspects of the present disclosure. The slip ratio R expressed by Formula 1 may be an example of a "slip degree value" according to aspects of the present disclosure. $X_{MID}$ expressed by Formula 2 may be an example of a "first number of rotations" according to aspects of the present disclosure. $X_{PF}$ used in Formula 2 may be an example of a "second number of rotations" according to aspects of the present disclosure. $X^*_{MID}$ expressed by Formula 3 may be an example of a "third number of rotations" according to aspects of the present disclosure. Moreover, $X_{MID}$ expressed by Formula 5 may be an example of the "first number of rotations" according to aspects of the present disclosure. In this case, $X_{PF}$ used in Formula 5 may be an example of the "second number of rotations" according to aspects of the present disclosure. In this case, $X_{RST}$ expressed by Formula 7 may be an example of the "third number of rotations" according to aspects of the present disclosure. Furthermore, $X^*_{MID}$ expressed by Formula 8 may be an example of the "first number of rotations" according to aspects of the present disclosure. In this case, $X^*_{RST}$ expressed by Formula 9 may be an example of the "third number of rotations" according to aspects of the present disclosure.

What is claimed is:

1. An image forming apparatus comprising:

a sheet medium storage configured to accommodate a sheet medium;

a first roller configured to feed, from the sheet medium storage, the sheet medium in a conveyance direction along a conveyance path;

a second roller disposed downstream of the first roller in the conveyance direction, the second roller being configured to convey the sheet medium fed by the first roller in the conveyance direction along the conveyance path;

a print engine disposed downstream of the second roller in the conveyance direction, the print engine being configured to form an image on the sheet medium conveyed by the second roller; and a controller configured to:

perform one or more times a first image forming process that comprises:

causing the print engine to perform image formation on the sheet medium; and conveying the sheet medium in the conveyance direction by rotating the first roller by a first number of rotations and rotating the second roller by a second number of rotations smaller than the first number of rotations; and when a count of times the first image forming process has been performed becomes a particular number of times, perform a second image forming process that comprises:

causing the print engine to perform image formation on the sheet medium; and conveying the sheet medium in the conveyance direction by rotating the first roller by a third number of rotations smaller than the first number of rotations and rotating the second roller by the second number of rotations;

wherein the controller is further configured to:

perform skew correction to cause the first roller to feed the sheet medium in a state where a leading end of the sheet medium is in contact with the second roller;

after the skew correction, perform initial sheet placement to cause the first roller and the second roller to feed the sheet medium by a particular feed amount by rotating the first roller by a smaller number of rotations than the second roller;

set an initial value based on a feed amount of the sheet medium fed by the first roller during the skew correction, and a difference in the number of rotations between the first roller and the second roller in the initial sheet placement;

after the initial sheet placement, repeatedly perform the first image forming process a plurality of times, wherein each time the first image forming process is performed, the controller cumulatively adds to the initial value a difference value obtained by subtracting the second number of rotations from the first number of rotations, thereby obtaining an accumulated value; and when the accumulated value exceeds a threshold, perform the second image forming process.

2. The image forming apparatus according to claim 1, wherein at least one of the first number of rotations and the third number of rotations is a value obtained through a correction made by the controller according to at least one factor selected from a group of factors consisting of:

characteristics of the sheet medium;

a usage status of the sheet medium;

a quality of image formation by the print engine; and a time elapsed since the image forming apparatus began to be used.

3. The image forming apparatus according to claim 2, wherein the sheet medium storage is further configured to accommodate a roll body formed as a long sheet medium wound in a roll shape, and wherein the usage status of the sheet medium corresponds to a cumulative used amount or a remaining amount of the long sheet medium since the long sheet medium began to be first unwound from the roll body and used.

4. The image forming apparatus according to claim 1, wherein at least one of the first number of rotations and the third number of rotations is a value obtained through a correction made by the controller according to a slip degree value, the slip degree value indicating a degree to which the first roller slips over the sheet medium.

5. The image forming apparatus according to claim 1, wherein the controller comprises:

a processor; and a non-transitory computer-readable storage medium storing computer-readable instructions configured to, when executed by the processor, cause the controller to:

perform the first image forming process one or more times; and perform the second image forming process when the count of times the first image forming process has been performed becomes the particular number of times.

6. A method implementable on a controller of an image forming apparatus, the method comprising:

performing one or more times a first image forming process that comprises:

causing a print engine to perform image formation on a sheet medium; and conveying the sheet medium in a conveyance direction by rotating a first roller by a first number of rotations and rotating a second roller by a second number of rotations, the second roller being disposed downstream of the first roller in the conveyance direction, the second number of rotations being smaller than the first number of rotations; and when a count of times the first image forming process has been performed becomes a particular number of times, performing a second image forming process that comprises:

causing the print engine to perform image formation on the sheet medium; and conveying the sheet medium in the conveyance direction by rotating the first roller by a third number of rotations smaller than the first number of rotations and rotating the second roller by the second number of rotations, wherein the method further comprises:

performing skew correction to cause the first roller to feed the sheet medium in a state where a leading end of the sheet medium is in contact with the second roller;

after the skew correction, performing initial sheet placement to cause the first roller and the second roller to feed the sheet medium by a particular feed amount by rotating the first roller by a smaller number of rotations than the second roller;

setting an initial value based on a feed amount of the sheet medium fed by the first roller during the skew correction, and a difference in the number of rotations between the first roller and the second roller in the initial sheet placement;

after the initial sheet placement, repeatedly performing the first image forming process a plurality of times, wherein each time the first image forming process is performed, a difference value obtained by subtracting the second number of rotations from the first number of rotations is cumulatively added to the initial value, thereby obtaining an accumulated value; and when the accumulated value exceeds a threshold, performing the second image forming process, wherein the image forming apparatus comprises:

a sheet medium storage configured to accommodate the sheet medium;

the first roller configured to feed, from the sheet medium storage, the sheet medium in the conveyance direction along a conveyance path;

the second roller configured to convey the sheet medium fed by the first roller in the conveyance direction along the conveyance path;

the print engine disposed downstream of the second roller in the conveyance direction; and the controller.

7. The method according to claim 6, wherein at least one of the first number of rotations and the third number of rotations is a value obtained through a correction made according to at least one factor selected from a group of factors consisting of:

characteristics of the sheet medium;

a usage status of the sheet medium;

a quality of image formation by the print engine; and a time elapsed since the image forming apparatus began to be used.

8. The method according to claim 7, wherein the sheet medium storage is further configured to accommodate a roll body formed as a long sheet medium wound in a roll shape, and wherein the usage status of the sheet medium corresponds to a cumulative used amount or a remaining amount of the long sheet medium since the long sheet medium began to be first unwound from the roll body and used.

9. The method according to claim 6, wherein at least one of the first number of rotations and the third number of rotations is a value obtained through a correction made according to a slip degree value, the slip degree value indicating a degree to which the first roller slips over the sheet medium.

* * * * *